US012613593B2

(12) United States Patent
Lim

(10) Patent No.: US 12,613,593 B2
(45) Date of Patent: Apr. 28, 2026

(54) DISPLAY DEVICE AND A TOUCH SENSING SYSTEM INCLUDING THE SAME

(71) Applicant: SAMSUNG DISPLAY CO., LTD., Yongin-si (KR)

(72) Inventor: Sang Hyun Lim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 19/008,804

(22) Filed: Jan. 3, 2025

(65) Prior Publication Data

US 2025/0138673 A1 May 1, 2025

Related U.S. Application Data

(63) Continuation of application No. 18/093,926, filed on Jan. 6, 2023, now Pat. No. 12,216,860.

(30) Foreign Application Priority Data

Jun. 15, 2022 (KR) ........................ 10-2022-0072565

(51) Int. Cl.
*G06F 3/041* (2006.01)
*G06F 3/044* (2006.01)

(52) U.S. Cl.
CPC ........ *G06F 3/04166* (2019.05); *G06F 3/0446* (2019.05)

(58) Field of Classification Search
CPC ............... G06F 3/04166; G06F 3/0446; G06F 2203/04106; G06F 3/0441; G06F 3/046;
(Continued)

(56) References Cited

U.S. PATENT DOCUMENTS

| 11,307,708 B2 | 4/2022 | Kim et al. |
| 11,567,593 B2 | 1/2023 | Kim et al. |

(Continued)

FOREIGN PATENT DOCUMENTS

| EP | 1647879 | 4/2006 |
| EP | 2637082 | 9/2013 |

(Continued)

OTHER PUBLICATIONS

Partial European Search Report issued in corresponding Application No. EP 23165548.1 on Oct. 16, 2023.

(Continued)

*Primary Examiner* — Pegeman Karimi
(74) *Attorney, Agent, or Firm* — F. CHAU & ASSOCIATES, LLC

(57) ABSTRACT

A display device including: a display panel in which a plurality of pixels are arranged in an image display area; a touch sensing unit disposed on a surface of the display panel, wherein the touch sensing unit is configured to sense a touch of an electronic pen; a display driving circuit configured to drive the pixels; and a touch sensing circuit configured to generate touch coordinate data by detecting a touch position of the electronic pen, wherein the touch sensing circuit is configured to drive pen touch electrodes so that the electronic pen is electromagnetically charged, and to recognize a touch and a touch position of the electronic pen by detecting a variation of a pen touch sensing signal of the pen touch electrodes.

20 Claims, 27 Drawing Sheets

(58) Field of Classification Search
CPC .. G06F 3/03545; G02F 1/13338; H10K 59/40
See application file for complete search history.

(56) References Cited

U.S. PATENT DOCUMENTS

| | | |
|---|---|---|
| 11,733,798 B2 | 8/2023 | Kim et al. |
| 2004/0039545 A1 | 2/2004 | Katsurahira |
| 2008/0007539 A1 | 1/2008 | Hotelling |
| 2011/0205191 A1* | 8/2011 | Hou .................... G06F 3/03545 |
| | | 345/179 |
| 2012/0062520 A1* | 3/2012 | Knee ................... G06F 3/03545 |
| | | 345/179 |
| 2014/0078101 A1* | 3/2014 | Katsurahira .......... G06F 3/0442 |
| | | 345/174 |
| 2017/0285771 A1* | 10/2017 | Jung ..................... G06F 3/0383 |
| 2018/0059461 A1* | 3/2018 | Katsuta ............... G06F 3/04164 |
| 2018/0329527 A1 | 11/2018 | Park et al. |
| 2021/0311590 A1 | 10/2021 | Kim et al. |
| 2023/0409142 A1 | 12/2023 | Lim |

FOREIGN PATENT DOCUMENTS

| | | |
|---|---|---|
| JP | 2000-099256 | 4/2000 |
| JP | 2011-253266 | 12/2011 |
| JP | 2015-161970 | 9/2015 |
| JP | 6256097 | 1/2018 |
| KR | 10-2018-0124398 A | 11/2018 |
| KR | 10-2020-0053700 A | 5/2020 |
| KR | 10-2021-0010724 A | 1/2021 |
| KR | 10-2021-0093423 | 7/2021 |
| KR | 10-2340935 | 12/2021 |

OTHER PUBLICATIONS

Extended European Search Report issued in corresponding EP Application No. 23165548.1 on Jan. 29, 2024.
Office Action issued in corresponding Korean Application No. KR 10-2022-0072565 on Dec. 28, 2025.

\* cited by examiner

DISPLAY DEVICE AND A TOUCH SENSING SYSTEM INCLUDING THE SAME

CROSS-REFERENCE TO RELATED APPLICATIONS

This application is a continuation of U.S. patent application Ser. No. 18/093,926 filed on Jan. 6, 2023, which claims priority under 35 U.S.C. 119 to Korean Patent Application No. 10-2022-0072565 filed on Jun. 15, 2022 in the Korean Intellectual Property Office, the disclosures of which are incorporated by reference herein in their entireties.

1. Technical Field

The present disclosure relates to a display device and a touch sensing system including the same.

2. Description of the Related Art

A display device, which is an output device for displaying images, is experiencing increased demand in various fields. For example, display devices have been applied to various electronic devices such as smartphones, digital cameras, laptop computers, navigation devices, and smart televisions. The display device may be a flat panel display device such as a liquid crystal display device, a field emission display device and an organic light emitting display device. Among the flat panel display devices, since each pixel of a display panel may include a light emitting element capable of emitting light by itself, an image can be displayed without a backlight unit. In other words, these display devices are self-emissive.

A recent display device supports a touch input made with a part of a user's body part (e.g., a finger) and a touch input made with an electronic pen. The touch input made with the electronic pen allows the display device to more precisely detect the touch position compared to the touch input made with a part of a user's body.

SUMMARY

Embodiments of the present disclosure provide a display device capable of sensing a touch input of an electronic pen by sensing an electromagnetic charge amount of the electronic pen, and a touch sensing system including the same.

Embodiments of the present disclosure also provide a display device capable of sensing a touch input of an electronic pen by sensing a charge or discharge amount of the electronic pen by distinguishing between a period of recognizing an approach and a touch start of the electronic pen and a period of continuous touch inputs, and a touch sensing system including the same.

According to an embodiment of the present disclosure, there is provided a display device including: a display panel in which a plurality of pixels are arranged in an image display area; a touch sensing unit disposed on a surface of the display panel, wherein the touch sensing unit is configured to sense a touch of an electronic pen; a display driving circuit configured to drive the pixels; and a touch sensing circuit configured to generate touch coordinate data by detecting a touch position of the electronic pen, wherein the touch sensing circuit is configured to drive pen touch electrodes so that the electronic pen is electromagnetically charged, and to recognize a touch and a touch position of the electronic pen by detecting a variation of a pen touch sensing signal of the pen touch electrodes.

The touch sensing unit includes: first pen touch electrodes arranged in parallel with each other in a first direction in a pen touch sensing area; and second pen touch electrodes arranged in parallel with each other in a second direction crossing the first direction in the pen touch sensing area.

The first and second pen touch electrodes are formed in a coil having a shape of a rectangle, an ellipse, a circle, or a polygon, and a first end and a second end of each of the first and second pen touch electrodes are electrically connected to the touch sensing circuit.

The touch sensing circuit is configured to supply pen touch driving signals during at least one frame period to the first pen touch electrodes in order from a first side of the pen touch sensing area in the first direction to a second side of the pen touch sensing area in the first direction, and to supply the pen touch driving signals during at least one frame period to the second pen touch electrodes in order from a third side of the pen touch sensing area in the second direction to a fourth side of the pen touch sensing area in the second direction.

The touch sensing circuit is configured to simultaneously supply pen touch driving signals to the first pen touch electrodes arranged in the first direction and the second pen touch electrodes arranged in the second direction in units of at least one frame.

The touch sensing circuit includes: at least one driving signal supply unit configured to supply a pulse type pen touch driving signal to the first and second pen touch electrodes; and at least one signal analysis circuit unit configured to detect an amplitude variation of pen touch sensing signals outputted through the first and second pen touch electrodes.

The touch sensing circuit includes: a plurality of first driving signal supply units connected one-to-one to first ends of the first pen touch electrodes to supply pen touch driving signals to the first pen touch electrodes; a plurality of first signal analysis circuit units connected one-to-one to second ends of the first pen touch electrodes to respectively analyze pen touch sensing signals inputted through the first pen touch electrodes; a plurality of second driving signal supply units connected one-to-one to first ends of the second pen touch electrodes to supply the pen touch driving signals to the second pen touch electrodes; and a plurality of second signal analysis circuit units connected one-to-one to second ends of the second pen touch electrodes to respectively analyze the pen touch sensing signals inputted through the second pen touch electrodes.

Each of the first and second signal analysis circuit units includes: at least one load capacitor connected in parallel with the first and second pen touch electrodes to stabilize an output current of each of the first and second pen touch electrodes; an envelope detector connected in series with an output terminal of each of the first and second pen touch electrodes to detect an envelope variation of the pen touch sensing signal outputted through the load capacitor, and output an amplitude decrement detection signal according to the envelope variation; an AC capacitor connected in series with the envelope detector to prevent a reversal of the amplitude decrement detection signal according to the envelope variation; and an operational amplifier connected in series with the AC capacitor to amplify and output the amplitude decrement detection signal with respect to the pen touch sensing signal.

The touch sensing circuit includes: a plurality of first driving signal supply units connected one-to-one to first ends of the first pen touch electrodes to sequentially supply pen touch driving signals to the first pen touch electrodes;

one first signal analysis circuit unit electrically connected to all of the first pen touch electrodes to analyze the pen touch sensing signals inputted through all of the first pen touch electrodes; a plurality of second driving signal supply units connected one-to-one to first ends of the second pen touch electrodes to sequentially supply the pen touch driving signals to the second pen touch electrodes; and one second signal analysis circuit unit electrically connected to all of the second pen touch electrodes to analyze the pen touch sensing signals inputted through all of the second pen touch electrodes.

The touch sensing circuit includes: one first driving signal supply unit electrically connected to all of the first pen touch electrodes to simultaneously supply pen touch driving signals to the first pen touch electrodes; a plurality of first signal analysis circuit units connected one-to-one to the first pen touch electrodes to analyze pen touch sensing signals respectively inputted from the first pen touch electrodes; one second driving signal supply unit electrically connected to all of the second pen touch electrodes to simultaneously supply the pen touch driving signals to the second pen touch electrodes; and a plurality of second signal analysis circuit units connected one-to-one to the second pen touch electrodes to analyze pen touch signals respectively inputted from the second pen touch electrodes.

The touch sensing circuit includes: one first driving signal supply unit connected to all of the first pen touch electrodes to supply pen touch driving signals to all of the first pen touch electrodes during a charging period of the electronic pen in a touch start detection period of the electronic pen and a touch position detection period of the electronic pen; a plurality of first signal analysis circuit units connected one-to-one to the first pen touch electrodes to analyze pen touch sensing signals respectively inputted from the first pen touch electrodes during the touch start detection period of the electronic pen; one second driving signal supply unit connected to all of the second pen touch electrodes to supply pen touch driving signals to all of the second pen touch electrodes during the charging period of the electronic pen in the touch start detection period of the electronic pen and the touch position detection period of the electronic pen; a plurality of second signal analysis circuit units connected one-to-one to the second pen touch electrodes to analyze pen touch sensing signals respectively inputted from the second pen touch electrodes during the touch start detection period of the electronic pen; and a plurality of third signal analysis circuit units configured to detect the touch position of the electronic pen by sensing a variation of the pen touch sensing signal of each of the first and second pen touch electrodes according to a discharge amount of the electronic pen during a discharging period of the electronic pen in the touch position detection period of the electronic pen.

The plurality of third signal analysis circuit units are configured to compare, with a reference signal of a preset threshold, the pen touch sensing signals respectively inputted through the first and second pen touch electrodes during each discharging period of the electronic pen in the touch position detection period of the electronic pen, and to determine that a touch has been made by the electronic pen if a voltage level of the pen touch sensing signals is greater than the preset threshold, and determine the touch position according to a position of at least one of the first and second pen touch electrodes at which it is determined that the touch has been made.

Each of the first and second signal analysis circuit units is configured to stabilize pen touch sensing signals inputted through first and second pen touch electrodes during the touch start detection period of the electronic pen using at least one load capacitor, to detect an envelope variation of the pen touch sensing signal outputted through the load capacitor using an envelope detector and generate an amplitude decrement detection signal according to the envelope variation, and to amplify the amplitude decrement detection signal with respect to the pen touch sensing signal and detect a touch position with respect to each of the first and second pen touch electrodes according to an amplitude variation of the amplitude decrement detection signal.

The touch sensing circuit includes: a plurality of first switches disposed between each of the first and second pen touch electrodes and the plurality of third signal analysis circuit units to electrically connect the first and second pen touch electrodes to the corresponding third signal analysis circuit units during each discharging period of the electronic pen during the touch position detection period of the electronic pen; and a plurality of second switches disposed between the first and second pen touch electrodes and at least one first or second signal analysis circuit unit to electrically connect the first and second pen touch electrodes to the first or second driving signal supply units during each charging period of the electronic pen in the touch start detection period and the touch position detection period of the electronic pen.

The touch sensing circuit further includes: a plurality of third switches disposed between the first and second pen touch electrodes and at least one of the first and second signal analysis circuit units to electrically connect the first and second pen touch electrodes to at least one of the first and second signal analysis circuit units during each touch start detection period of the electronic pen; and a plurality of fourth switches disposed between the first and second pen touch electrodes and a ground or low potential voltage source to electrically connect the first and second pen touch electrodes to the ground or low potential voltage source during each touch position detection period of the electronic pen.

The touch sensing circuit turns on the second and third switches during the touch start detection period so that the pen touch driving signals from the first and second driving signal supply units are supplied to first ends of the first and second pen touch electrodes, and the pen touch sensing signals outputted to second ends of the first and second pen touch electrodes are respectively outputted to the first and second signal analysis circuit units.

The touch sensing circuit alternately and repeatedly turns on or turns off the first and second switches during predetermined ones of the charging/discharging periods so that charging and discharging operations of the electronic pen are alternately repeated during the touch position detection period.

The first and second pen touch electrodes are bar type electrodes arranged in parallel with each other in the first or second direction, among the first pen touch electrodes, at least one first pen touch electrode and at least one first pen touch electrode disposed adjacent to each other are electrically connected to each other, and among the second pen touch electrodes, at least one second pen touch electrode and at least one second pen touch electrode disposed adjacent to each other are electrically connected to each other.

Odd-numbered electrodes or electrodes included in an odd-numbered group among the first pen touch electrodes receive pen touch driving signals at their first ends, and even-numbered electrodes or electrodes included in an even-numbered group among the first pen touch electrodes output pen touch sensing signals, and odd-numbered electrodes or electrodes included in an odd-numbered group among the second pen touch electrodes receive the pen touch driving signals at their first ends, and even-numbered electrodes or electrodes included in an even-numbered group among the second pen touch electrodes output the pen touch sensing signals.

According to an embodiment of the present disclosure, there is provided a touch sensing system including: a display device including a display panel in which a plurality of pixels are arranged in an image display area, and a display driving circuit configured to drive the pixels; a first touch sensing unit disposed on a surface of the display panel to sense a touch by a user's body part; a second touch sensing unit disposed on a surface of the first touch sensing unit to sense a touch of an electronic pen; and a touch sensing circuit configured to generate touch coordinate data by detecting a touch position of the electronic pen, wherein the touch sensing circuit is configured to drive pen touch electrodes so that the electronic pen is electromagnetically charged through the pen touch electrodes, and to recognize a touch and a touch position of the electronic pen by detecting a variation of a pen touch sensing signal of the pen touch electrodes.

According to an embodiment of the present disclosure, there is provided a display device including: a display panel in which a plurality of pixels are arranged in an image display area; a touch sensing unit disposed on the display panel, wherein the touch sensing unit includes first touch electrodes arranged in a first direction and second touch electrodes arranged in a second direction, and wherein the touch sensing unit is configured to sense a touch of an electronic pen; a display driving circuit configured to drive the pixels; and a touch sensing circuit configured drive the first and second touch electrodes so that the electronic pen is electromagnetically charged, and to recognize a touch position of the electronic pen by detecting variations of touch sensing signals of the first and second touch electrodes.

In accordance with the display device and the touch sensing system including the same according to embodiments of the present disclosure, since the touch input of the electronic pen is sensed by sensing the charge amount of the electronic pen without distinguishing between a charging period and a sensing period of the electronic pen, it is possible to continuously and rapidly detect the touch input of the electronic pen.

In addition, during the period of recognizing the approach and the touch start of the electronic pen, the touch start of the electronic pen can be rapidly recognized by sensing the charge amount of the electronic pen. During the period of continuous touch inputs, the touch input of the electronic pen can be detected accurately and stably by distinguishing between the charging period and the sensing period of the electronic pen and sensing the discharge amount during the sensing period.

BRIEF DESCRIPTION OF THE DRAWINGS

The above and other features of the present disclosure will become more apparent by describing in detail embodiments thereof with reference to the attached drawings, in which.

DETAILED DESCRIPTION OF THE EMBODIMENTS

The present disclosure will now be described more fully hereinafter with reference to the accompanying drawings, in which embodiments of the invention are shown. This disclosure may, however, be embodied in different forms and should not be construed as limited to the embodiments set forth herein.

It will be understood that when a layer is referred to as being "on" another layer or substrate, it can be directly on the other layer or substrate, or intervening layers may also be present. The same reference numbers may indicate the same components throughout the specification.

It will also be understood that, although the terms "first," "second," etc. may be used herein to describe various elements, these elements should not be limited by these terms. These terms are used to distinguish one element from another element. For instance, a first element discussed below could be termed a second element. Similarly, the second element could also be termed the first element.

Each of the features of the various embodiments of the present disclosure may be combined or combined with each other, in part or in whole, and technically various interlocking and driving are possible. Each embodiment may be implemented independently of each other or may be implemented together in an association.

Figure 1:
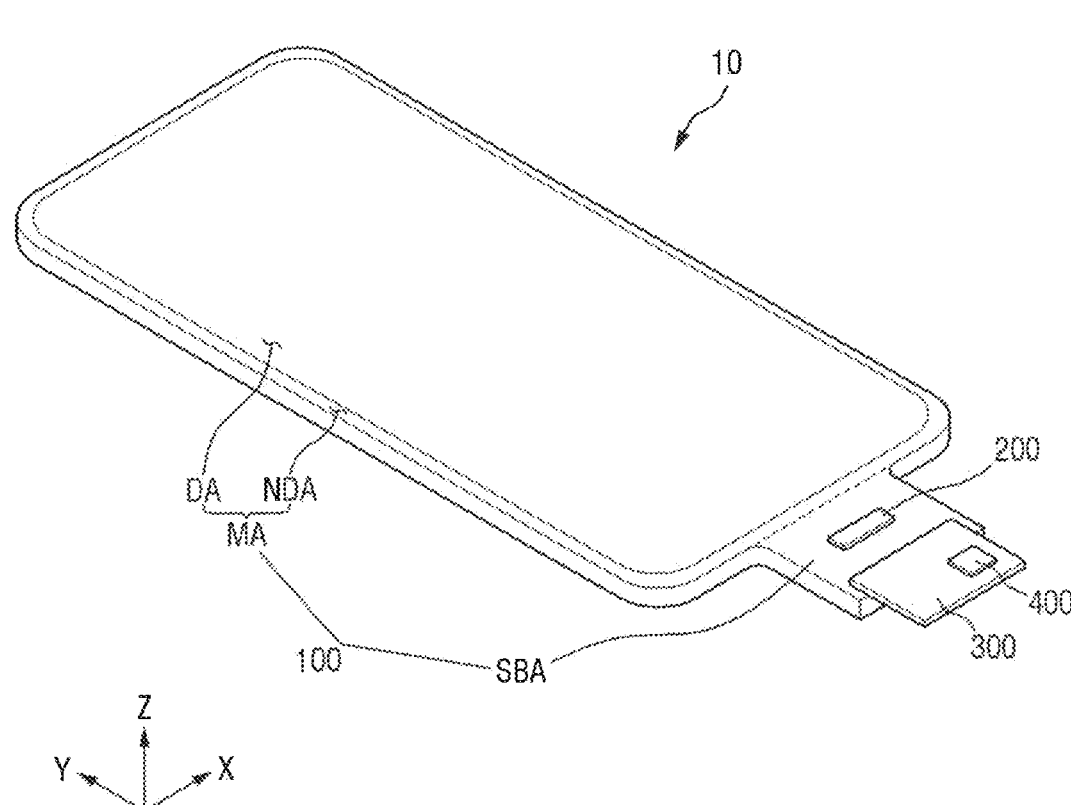
FIG. 1 is a perspective view illustrating a display device according to one embodiment of the present disclosure.
Figure 2:
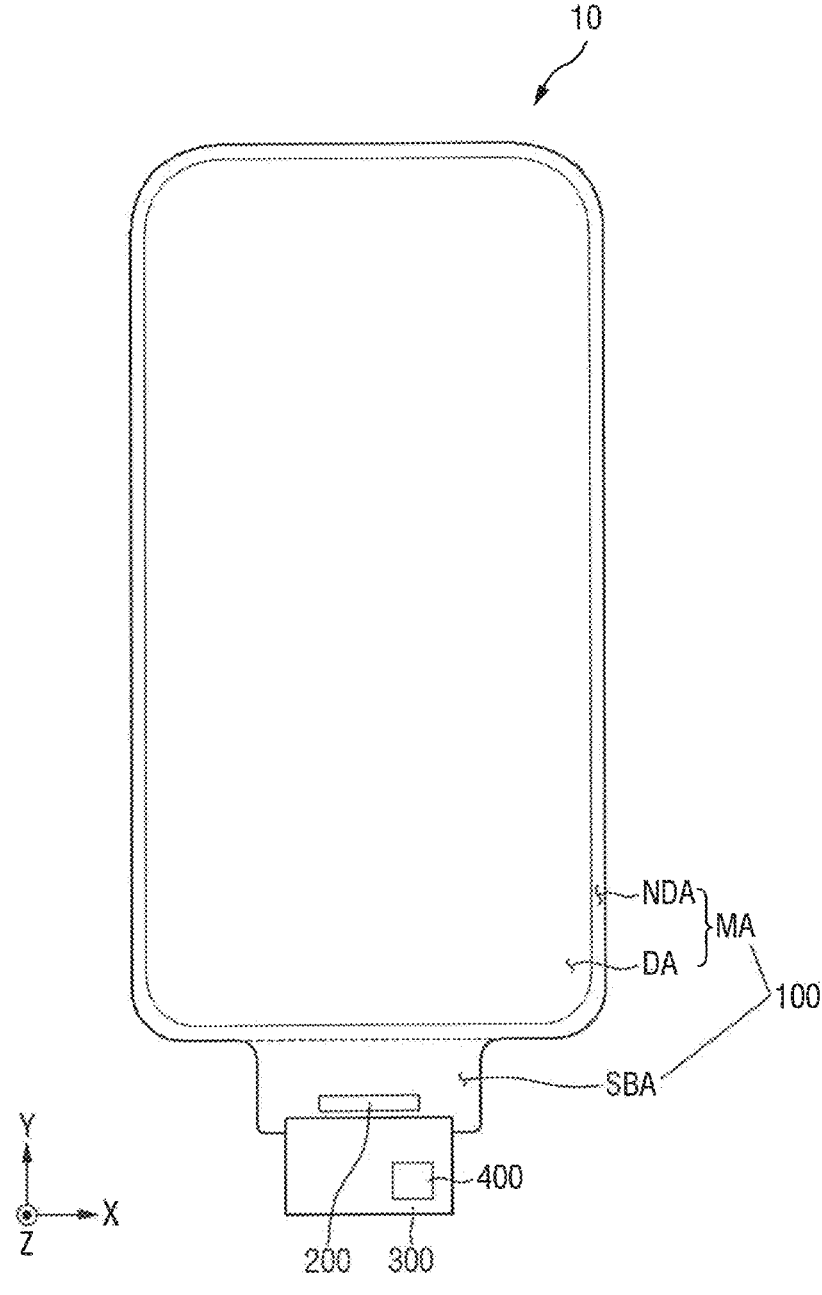
FIG. 2 is a plan view illustrating a display device according to one embodiment of the present disclosure.
Figure 3:
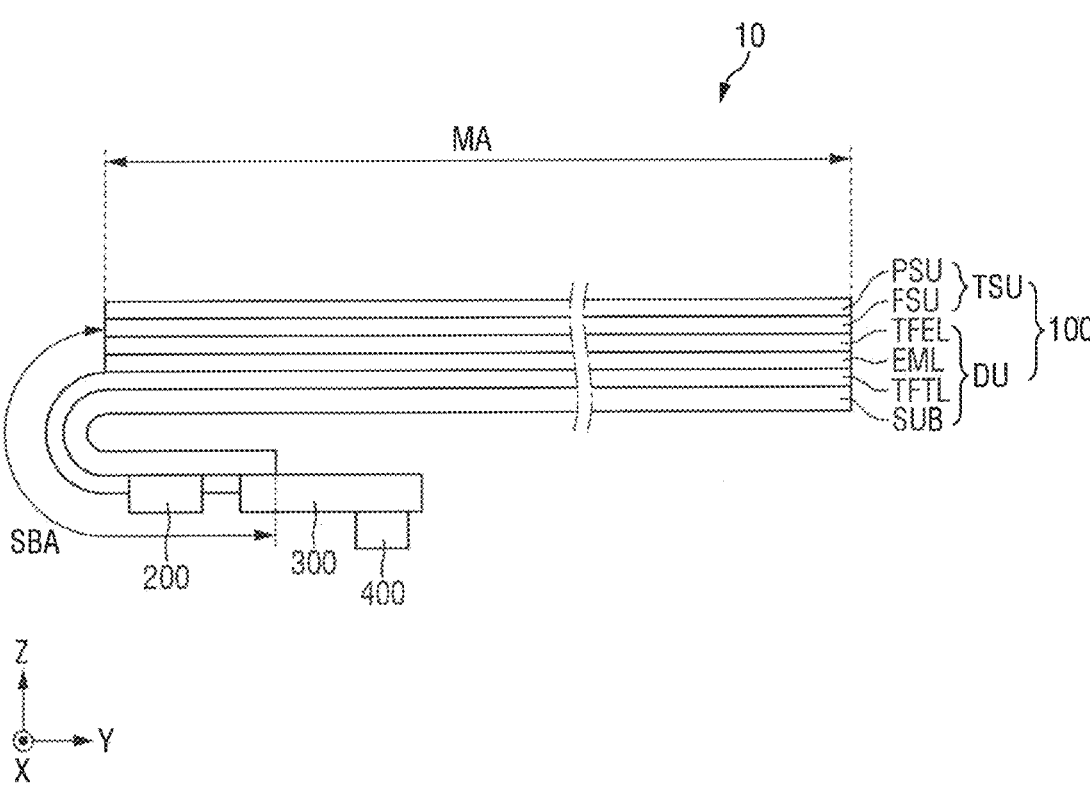
FIG. 3 is a side view illustrating a display device according to one embodiment of the present disclosure.

FIG. 1 is a perspective view illustrating a display device according to one embodiment of the present disclosure. FIG. 2 is a plan view illustrating a display device according to one embodiment of the present disclosure. FIG. 3 is a side view illustrating a display device according to one embodiment of the present disclosure.

Referring to FIGS. 1 to 3, a display device 10 according to one embodiment of the present disclosure may be applied to portable electronic devices such as a mobile phone, a smartphone, a tablet personal computer, a mobile communication terminal, an electronic organizer, an electronic book, a portable multimedia player (PMP), a navigation system, an ultra mobile personal computer (UMPC) or the like. Alternatively, the display device 10 may be applied as a display unit of a television, a laptop, a monitor, a billboard, or an Internet-of-Things (IoT) terminal. Alternatively, the display device 10 may be applied to wearable devices such as a smart watch, a watch phone, a glasses type display, or a head mounted display (HMD). Alternatively, the display device 10 may be applied to a dashboard of a vehicle, a center fascia of a vehicle, a center information display (CID) disposed on a dashboard of a vehicle, a mirror display placed at side mirrors of a vehicle, or a display disposed on a rear surface of a front seat for rear seat entertainment of a vehicle.

The display device 10 may be a light emitting display device such as an organic light emitting display using an organic light emitting diode, a quantum dot light emitting display including a quantum dot light emitting layer, an inorganic light emitting display including an inorganic semiconductor, and a micro light emitting display using a micro or nano light emitting diode (LED). In the following description, it is assumed that the display device 10 is an organic light emitting display device, but the present disclosure is not limited thereto.

The display device 10 includes a display panel 100, a display driving circuit 200, a display circuit board 300, and a touch sensing circuit 400.

The display panel 100 may have a rectangular shape, in plan view, with short sides in a first direction (X-axis direction) and long sides in a second direction (Y-axis direction) crossing the first direction (X-axis direction). The corner where the short side in the first direction (X-axis direction) and the long side in the second direction (Y-axis direction) meet may be rounded to have a predetermined curvature or may be right-angled. The planar shape of the display panel 100 is not limited to the rectangular shape, and may be formed in another polygonal shape, a circular shape or an elliptical shape. The display panel 100 may be flat, but is not limited thereto. For example, the display panel 100 may include a curved portion formed at left and right ends and having a predetermined curvature or a varying curvature. In addition, the display panel 100 may be flexible so that it can be curved, bent, folded, or rolled.

The display panel 100 includes a main region MA and a sub-region SBA.

The main region MA includes a display area DA in which an image is displayed and a non-display area NDA that is a peripheral area of the display area DA. The display area DA includes pixels for displaying an image. The display area DA may emit light from a plurality of opening areas or an emission area of each pixel. For example, the display panel 100 may include a pixel circuit including switching elements, a pixel defining layer defining an emission area or an opening area, and a self-light emitting element. For example, the self-light emitting element may include an organic light emitting diode including an organic light emitting layer, a quantum dot light emitting diode including a quantum dot light emitting layer, or an inorganic light emitting diode including an inorganic semiconductor, but is not limited thereto.

The non-display area NDA may be an area outside the display area DA. The non-display area NDA may be an edge area of the main region MA of the display panel 100. The non-display area NDA may include a gate driver that supplies gate signals to gate lines, and fan-out lines that connect the display driving circuit 200 to the display area DA.

The sub-region SBA may protrude in the second direction (Y-axis direction) from one side of the main region MA.

Although FIGS. 1 and 2 illustrate that the sub-region SBA is unfolded, the sub-region SBA may be bent as shown in FIG. 3. In this case, the sub-region SBA may be disposed on the rear surface of the display panel 100. In the case where the sub-region SBA is bent, it may overlap the main region MA in a third direction (Z-axis direction) that is a thickness direction of the substrate SUB. The display driving circuit 200 may be arranged in the sub-region SBA.

In addition, as shown in FIG. 3, the display panel 100 includes a display module DU having a substrate SUB, a thin film transistor layer TFTL, a light emitting element layer EML, and an encapsulation layer TFEL, and a touch sensing unit TSU formed on the front surface of the display module DU.

The thin film transistor layer TFTL may be disposed on the substrate SUB. The thin film transistor layer TFTL may be arranged in the main region MA and the sub-region SBA. The thin film transistor layer TFTL includes thin film transistors.

The light emitting element layer EML may be disposed on the thin film transistor layer TFTL. The light emitting element layer EML may be arranged in the display area DA of the main region MA. The light emitting element layer EML includes light emitting elements arranged in light emitting units.

The encapsulation layer TFEL may be disposed on the light emitting element layer EML. The encapsulation layer TFEL may be arranged in the display area DA and the non-display area NDA of the main region MA. The encapsulation layer TFEL includes at least one inorganic layer and at least one organic layer for encapsulating the light emitting element layer EML.

The touch sensing unit TSU may include a first touch sensing unit FSU and a second touch sensing unit PSU, or may include any one of the first and second touch sensing units FSU and PSU. The first and second touch sensing units FSU and PSU may be integrally formed with the display panel 100, or may be separately formed to be mounted or assembled on the front surface of the display panel 100. Each of the first and second touch sensing units FSU and PSU may be integrally formed.

For example, the first touch sensing unit FSU may be formed integrally with the encapsulation layer TFEL or be mounted on the encapsulation layer TFEL to sense a touch position of a body part such as a finger. The second touch sensing unit PSU may be integrally formed with the first touch sensing unit FSU or mounted on the first touch sensing unit FSU to sense a touch position of an electronic pen such as a stylus pen.

A cover window may be disposed on the second touch sensing unit PSU to protect the upper portion of the display panel 100. The cover window may be attached onto the second touch sensing unit PSU via a transparent adhesive member such as an optically clear adhesive (OCA) film or an optically clear resin (OCR). The cover window may be made of an inorganic material such as glass, or an organic material such as plastic or a polymer material. A polarizing film may be additionally disposed between the second touch sensing unit PSU and the cover window to prevent deterioration of image visibility due to reflection of external light.

The display driving circuit 200 may generate control signals and data voltages for driving the display panel 100. The display driving circuit 200 may be formed as an integrated circuit (IC) and attached onto the display panel 100 by a chip on glass (COG) method, a chip on plastic (COP) method, or an ultrasonic bonding method, but the present disclosure is not limited thereto. For example, the display driving circuit 200 may be adhered on the display circuit board 300 by a chip on film (COF) method.

The display circuit board 300 may be attached to one end of the sub-region SBA of the display panel 100. As a consequence, the display circuit board 300 may be electrically connected to the display panel 100 and the display driving circuit 200. The display panel 100 and the display driving circuit 200 may receive digital video data, timing control signals, and driving voltages via the display circuit board 300. The display circuit board 300 may be a flexible printed circuit board, a printed circuit board, or a flexible film such as a chip on film.

The touch sensing circuit 400 may be disposed on the display circuit board 300. The touch sensing circuit 400 may be formed as an integrated circuit (IC) and attached to the display circuit board 300. Alternatively, the touch sensing circuit 400 may be attached onto the display circuit board 300 in a chip on film (COF) method.

The touch sensing circuit 400 is electrically connected to touch electrodes of the first touch sensing unit FSU to detect a touch input of a body part such as a user's finger through the first touch sensing unit FSU. Further, the touch sensing circuit 400 may be electrically connected to pen touch electrodes of the second touch sensing unit PSU to detect a touch and a touch position of an electronic pen through the second touch sensing unit PSU. The touch electrodes of the first touch sensing unit FSU may be referred to as first electrodes and the pen touch electrodes of the second touch sensing unit PSU may be referred to as second electrodes.

Specifically, the touch sensing circuit 400 applies touch driving signals (or first touch driving signals) to the touch electrodes of the first touch sensing unit FSU and measures a charge change amount of a mutual capacitance of each touch node formed by the touch electrodes. In this case, the touch sensing circuit 400 measures a change in a capacitance of the touch nodes according to a change in a current amount or a voltage level of a touch sensing signal (or a first touch sensing signal) received through the touch electrodes. In this manner, the touch sensing circuit 400 may determine whether a user's touch, a user's approach, or the like has been made or not according to the charge change amount of the mutual capacitance of each touch node of the first touch sensing unit FSU. The user's touch may mean that a user's body part such as a finger is in direct contact with one surface of the cover window disposed on the first touch sensing unit FSU. The user's approach may mean that a user's body part hovers above one surface of the cover window.

In addition, the touch sensing circuit 400 applies pen touch driving signals (or second touch driving signals) to the pen touch electrodes of the second touch sensing unit PSU, and receives pen touch sensing signals (or second touch sensing signals) outputted through the pen touch electrodes. Accordingly, the touch sensing circuit 400 may determine whether an approach, a touch, or the like of an electronic pen has been made or not according to variations of an amplitude and a frequency of the pen touch sensing signals.

The electronic pen may be a stylus pen that supports electromagnetic resonance using at least one pair of electrodes and a coil connected to the at least one pair of electrodes. The electronic pen may be charged in response to a magnetic field or an electromagnetic signal of the second touch sensing unit PSU, and may output a radio frequency signal when it is discharged.

Figure 4:
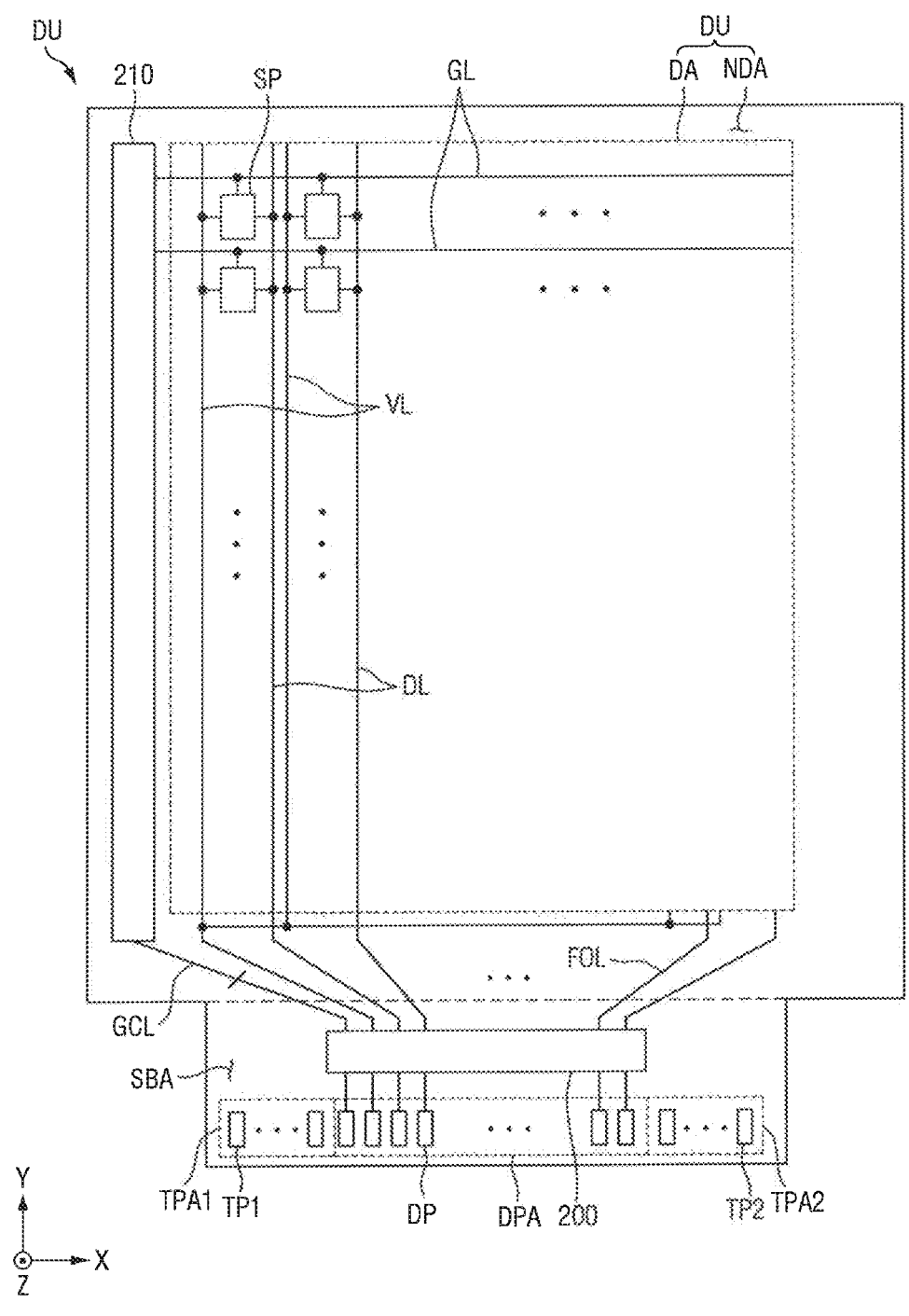
FIG. 4 is a layout diagram schematically showing an example of the display panel illustrated in FIGS. 1 to 3.

FIG. 4 is a layout diagram schematically showing an example of the display panel illustrated in FIGS. 1 to 3. Specifically, FIG. 4 is a layout diagram illustrating display area DA and the non-display area NDA of the display module DU before the touch sensing unit TSU is formed thereon.

The display area DA, which is an area for displaying an image, may be the central area of the display panel 100. The display area DA may include a plurality of pixels SP, a plurality of gate lines GL, a plurality of data lines DL, and a plurality of power lines VL. Each of the plurality of pixels SP may be a smallest unit that outputs light.

The plurality of gate lines GL may supply the gate signals received from a gate driver 210 to the plurality of pixels SP. The plurality of gate lines GL may extend in the X-axis direction and may be spaced apart from each other in the Y-axis direction that crosses the X-axis direction.

The plurality of data lines DL may supply data voltages received from the display driving circuit 200 to the plurality of pixels SP. The plurality of data lines DL may extend in the Y-axis direction and may be spaced apart from each other in the X-axis direction.

The plurality of power lines VL may supply a power voltage received from the display driving circuit 200 to the plurality of pixels SP. Here, the power voltage may be a driving voltage, an initialization voltage, or a reference voltage. The plurality of power lines VL may extend in the Y-axis direction and may be spaced apart from each other in the X-axis direction.

The non-display area NDA may surround the display area DA. The non-display area NDA may include the gate driver 210, fan-out lines FOL, and gate control lines GCL. The gate driver 210 may generate a plurality of gate signals based on a gate control signal, and may sequentially supply the plurality of gate signals to the plurality of gate lines GL according to a set order.

The fan-out lines FOL may extend from the display driving circuit 200 to the display area DA. The fan-out lines FOL may supply the data voltage received from the display driving circuit 200 to the plurality of data lines DL.

The gate control lines GCL may extend from the display driving circuit 200 to the gate driver 210. The gate control lines GCL may supply the gate control signal received from the display driving circuit 200 to the gate driver 210.

The sub-region SBA may include the display driving circuit 200, a display pad area DPA, and first and second touch pad areas TPA1 and TPA2.

The display driving circuit 200 may output timing control signals and data voltages to the fan-out lines FOL to drive the display panel 100. The display driving circuit 200 generates the timing control signals according to a display driving frequency preset based on display control firmware and generates the data voltages corresponding to image data. In addition, the data voltage may be supplied to the data line DL through the fan-out lines FOL according to the display driving frequency set in the firmware. Here, the data voltage may be supplied to the plurality of pixels SP to determine the luminance of the plurality of pixels SP. Further, the display driving circuit 200 may supply the timing control signals, which are generated according to a gate voltage and the display driving frequency of the firmware, to the gate driving unit 210 through the gate control lines GCL.

The display pad area DPA, the first touch pad area TPA1, and the second touch pad area TPA2 may be disposed at the edge of the sub-region SBA. The display pad area DPA, the first touch pad area TPA1, and the second touch pad area TPA2 may be electrically connected to the display circuit board 300 by using a low-resistance high-reliability material such as self assembly anisotropic conductive paste (SAP) or an anisotropic conductive film.

The display pad area DPA may include a plurality of display pad units. The plurality of display pad units may be connected to a separate main processor such as a graphic card via the display circuit board 300. The plurality of display pad units may be connected to the display circuit board 300 to receive digital video data, and may supply the digital video data to the display driving circuit 200.

Figure 5:
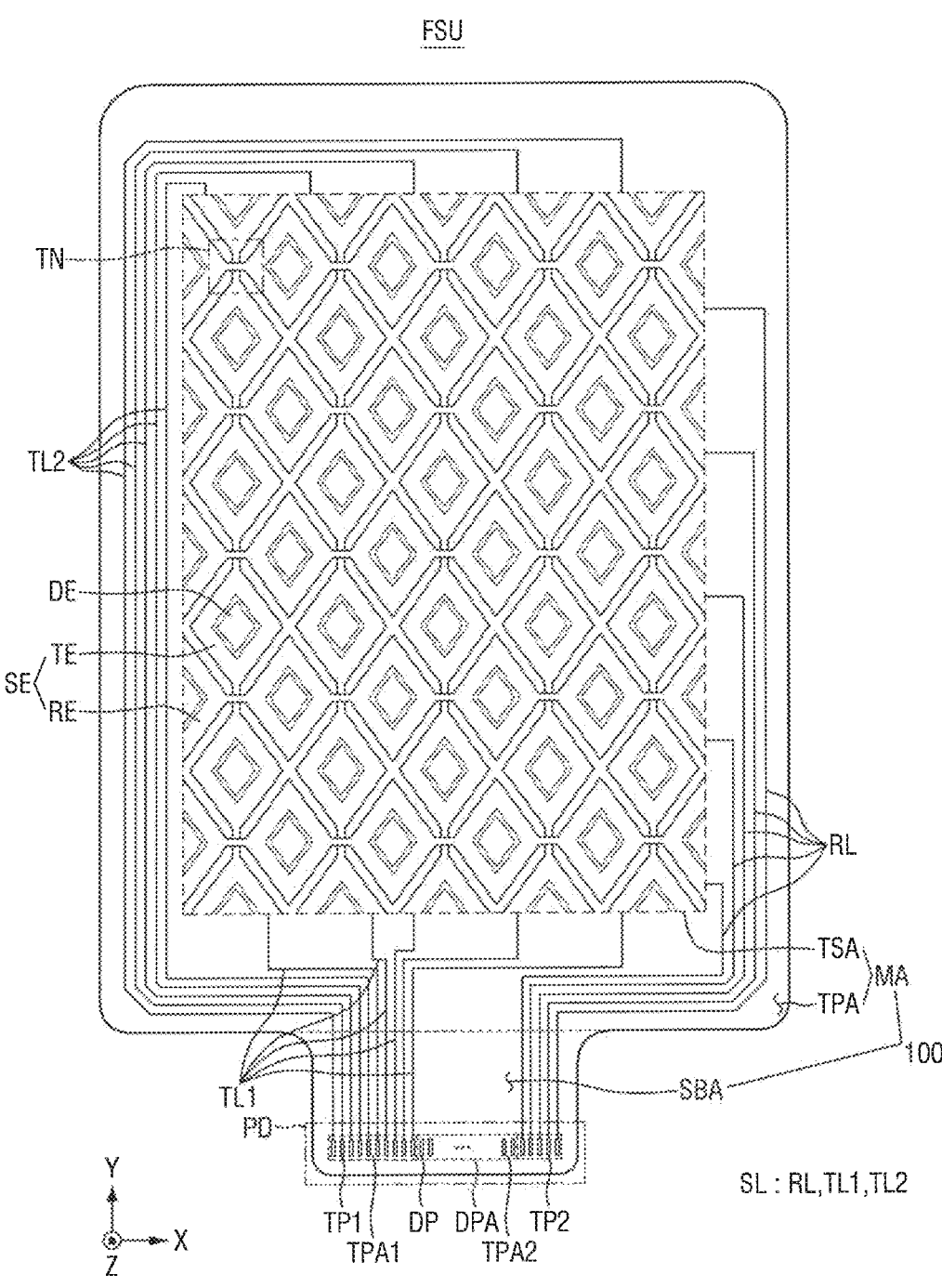
FIG. 5 is a layout diagram schematically illustrating an example of the first touch sensing unit shown in FIG. 3.

FIG. 5 is a layout diagram schematically illustrating an example of the first touch sensing unit shown in FIG. 3.

FIG. 5 mainly illustrates touch electrodes SE of the main area MA including two types of electrodes, for example, driving electrodes TE and sensing electrodes RE, and a mutual capacitance method in which a touch driving signal is applied to the driving electrodes TE and then a charge change amount of a mutual capacitance of each touch node is sensed through the sensing electrodes RE. However, the present disclosure is not limited thereto.

For simplicity of description, FIG. 5 illustrates only the driving electrodes TE, the sensing electrodes RE, dummy patterns DE, first touch lines SL, and first and second touch pads TP1 and TP2.

Referring to FIG. 5, the main area MA of the first touch sensing unit FSU includes a touch sensing area TSA for sensing a user's touch and a touch periphery area TPA disposed around the touch sensing area TSA. The touch sensing area TSA may overlap the display area DA of FIGS. 1 to 3, and the touch periphery area TPA may overlap the non-display area NDA.

The driving electrodes TE, the sensing electrodes RE, and the dummy patterns DE are disposed in the touch sensing area TSA. The driving electrodes TE and the sensing electrodes RE may be electrodes that generate the mutual capacitance to sense touch of an object or a person.

The sensing electrodes RE may be arranged side by side in the first direction (X-axis direction) and the second direction (Y-axis direction). The sensing electrodes RE may be electrically connected in the first direction (X-axis direction). The sensing electrodes RE adjacent in the first direction (X-axis direction) may be connected to each other. The sensing electrodes RE adjacent in the second direction (Y-axis direction) may be electrically separated from each other. Accordingly, a touch node TN where the mutual capacitance is generated may be disposed at each of intersections between the driving electrodes TE and the sensing electrodes RE. The plurality of touch nodes TN may correspond to the intersections between the driving electrodes TE and the sensing electrodes RE.

The driving electrodes TE may be arranged side by side in the first direction (X-axis direction) and the second direction (Y-axis direction). The driving electrode TE adjacent in the first direction (X-axis direction) may be electrically separated from each other. The driving electrodes TE may be electrically connected in the second direction (Y-axis direction). The driving electrodes TE, which are adjacent to each other in the second direction (Y-axis direction), may be connected to each other via a separate connection electrode.

Each of the dummy patterns DE may be surrounded by the driving electrode TE or the sensing electrode RE. Each of the dummy patterns DE may be electrically separated from the driving electrode TE or the sensing electrode RE. Each of the dummy patterns DE may be spaced apart from the driving electrode TE or the sensing electrode RE. Each of the dummy patterns DE may be electrically floating.

Although FIG. 5 illustrates that each of the driving electrodes TE, the sensing electrodes RE, and the dummy patterns DE has a rhombus planar shape, the present disclosure is not limited thereto. For example, each of the driving electrodes TE, the sensing electrodes RE, and the dummy patterns DE may have a quadrilateral shape other than a rhombus shape, a polygonal shape other than a quadrilateral shape, a circular shape, or an elliptical shape in a plan view.

The touch lines SL may be disposed in the touch periphery area TPA. The touch lines SL include first and second touch driving lines TL1 and TL2 connected to the driving electrodes TE, and touch sensing lines RL connected to the sensing electrodes RE.

The sensing electrodes RE disposed at one end of the touch sensing area TSA may be connected one-to-one to the touch sensing lines RL. For example, as shown in FIG. 5, among the sensing electrodes RE that are electrically connected to each other in the first direction (X-axis direction), the sensing electrodes RE disposed at the right end may be respectively connected to the touch sensing lines RL. In addition, the touch sensing lines RL may be connected one-to-one to the second touch pads TP2 disposed in a pad portion PD.

The driving electrodes TE arranged at one end of the touch sensing area TSA may be connected one-to-one to the first touch driving lines TL1, and the driving electrodes TE arranged at the other end of the touch sensing area TSA may be connected one-to-one to the second touch driving lines TL2. For example, among the driving electrodes TE that are electrically connected with each other in the second direction (Y-axis direction), the driving electrodes TE disposed at the lower end may be respectively connected to the first touch driving lines TL1, and the driving electrodes TE disposed at the upper end may be respectively connected to the second touch driving lines TL2. The second touch driving lines TL2 may be connected to the driving electrodes TE on the upper side of the touch sensing area TSA via the left outer side of the touch sensing area TSA.

The first touch driving lines TL1 and the second touch driving lines TL2 may be connected one-to-one to the first touch pads TP1 disposed in the pad portion PD. The driving electrodes TE are connected to the first and second touch driving lines TL1 and TL2 at both sides of the touch sensing area TSA to receive the touch driving signal. Accordingly, it is possible to prevent a difference between the touch driving signal applied to the driving electrodes TE disposed at the lower side of the touch sensing area TSA and the touch driving signal applied to the driving electrodes TE disposed at the upper side of the touch sensing area TSA due to a resistive-capacitive delay of the touch driving signal.

As shown in FIGS. 1 to 3, when the display circuit board 300 is connected to one side of a flexible film, the display pad area DPA and the first and second touch pad areas TPA1 and TPA2 of the pad portion PD may correspond to the pads of the display panel 100, which are connected to the display circuit board 300. Accordingly, the pads of the display panel 100 may be in contact with the top surfaces of the display pads DP, the first touch pads TP1, and the second touch pads TP2. The display pads DP, the first touch pads TP1, and the second touch pads TP2 may be electrically connected to the pads of the display circuit board 300 using a low-resistance high-reliability material such as SAP or an anisotropic conductive film. Therefore, the display pads DP, the first touch pads TP1, and the second touch pads TP2 may be electrically connected to the touch sensing circuit 400 disposed on the display circuit board 300.

Figure 6:
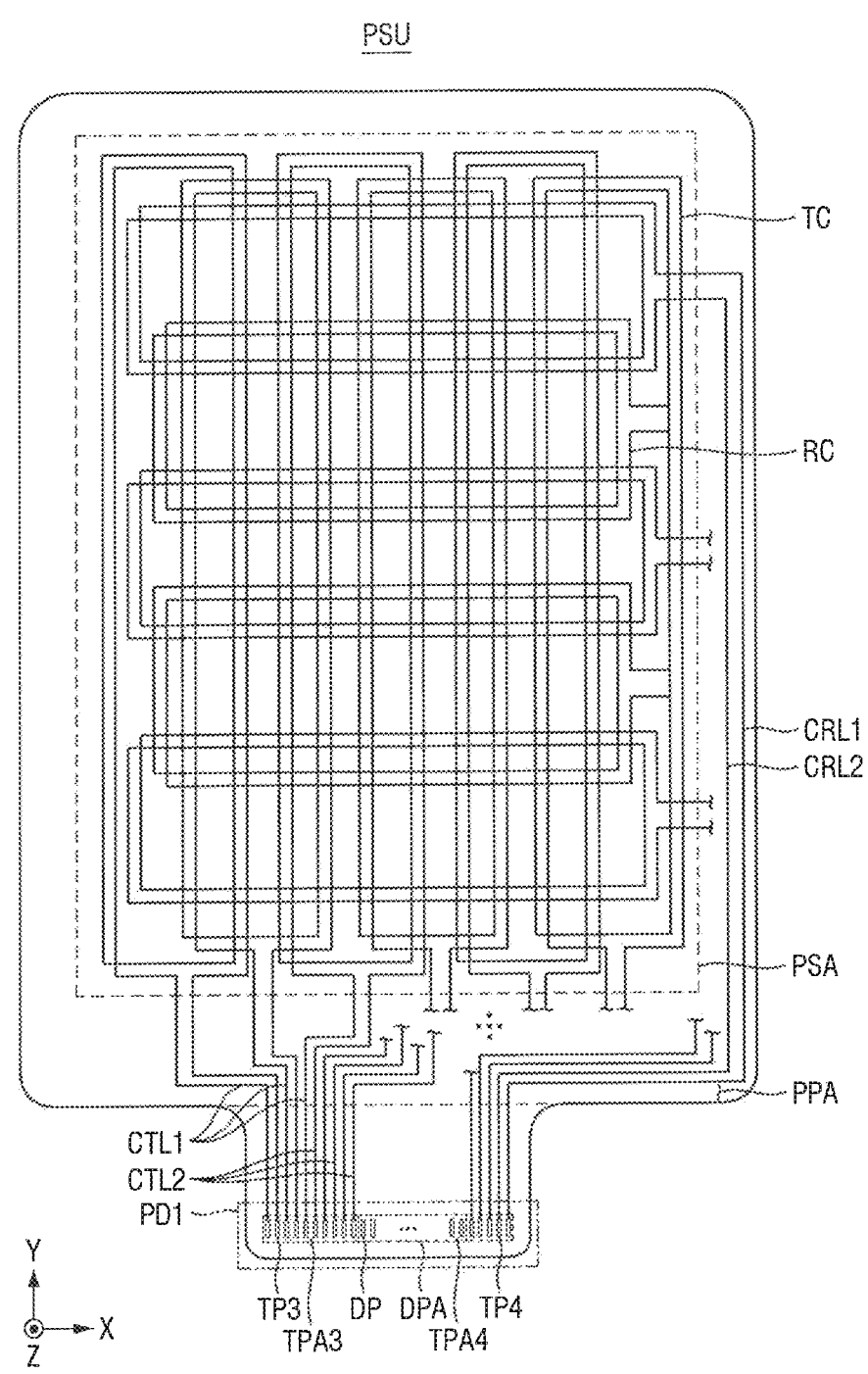
FIG. 6 is a layout diagram schematically illustrating an example of the second touch sensing unit shown in FIG. 3.

FIG. 6 is a layout diagram schematically illustrating an example of the second touch sensing unit shown in FIG. 3.

FIG. 6 illustrates a structural feature in which pen touch sensing area PSA includes two types of pen touch electrodes, for example, first coil electrodes TC and second coil electrodes RC, pen touch driving signals are applied to one ends of the first coil electrodes TC and the second coil electrodes RC, and then pen touch sensing signals are detected through the other ends of the first coil electrodes TC and the second coil electrodes RC. In other words, a pen touch driving signal may be applied to a first end of one of the first coil electrodes TC and a pen touch sensing signal may be detected through a second end of the one of the first coil electrodes TC. However, the structural feature of the first coil electrodes TC and the second coil electrodes RC is not limited to FIG. 6.

For simplicity of description, FIG. 6 illustrates only the first coil electrodes TC, the second coil electrodes RC, first input coil lines CTL1, first output coil lines CTL2, second input coil lines CRL1, and second output coil lines CRL2.

The pen touch sensing area PSA of FIG. 6 may overlap the display area DA of FIGS. 1 to 3, and a pen touch periphery area PPA may overlap the non-display area NDA.

The first coil electrodes TC and the second coil electrodes RC of the pen touch sensing area PSA may be coil-type electrodes that exchange electromagnetic signals with an electronic pen to sense a touch of the electronic pen.

The first coil electrodes TC may be arranged in parallel with each other in the first direction (X-axis direction), and at least one side of the first coil electrode TC may partially overlap one side of the first coil electrode TC adjacent thereto. Each first coil electrode TC receives the pen touch driving signal at one end of the coil through the first input coil line CTL1, and outputs the pen touch sensing signal to the first output coil line CTL2 that is connected to the other end of the coil.

The second coil electrodes RC may be arranged in parallel with each other in the second direction (Y-axis direction), and at least one side of the second coil electrode RC may partially overlap one side of the second coil electrode RC adjacent thereto. Each second coil electrode RC receives the pen touch driving signal at one end of the coil through the second input coil line CRL1, and outputs the pen touch sensing signal to the second output coil line CRL2 that is connected to the other end of the coil.

Although FIG. 6 illustrates a structure in which the first coil electrodes TC and the second coil electrodes RC are arranged in a rectangular coil shape, the present disclosure is not limited thereto. For example, the first coil electrodes TC and the second coil electrodes RC may be arranged in an elliptical, circular, or polygonal coil shape.

The first input coil lines CTL1 connected to one ends of the first coil electrodes TC and the first output coil lines CTL2 connected to the other ends of the first coil electrodes TC may be connected one-to-one to third touch pads TP3 that are arranged in a pad connection area PD1. For example, in FIG. 6, the leftmost first input coil line CTL1 is connected to a first end of the leftmost first coil electrode TC and the leftmost first output coil line CTL2 adjacent to the leftmost first input coil line CTL1 is connected a second end of the leftmost first coil electrode TC. In addition, the second input coil lines CRL1 connected to one ends of the second coil electrodes RC and the second output coil lines CRL2 connected to the other ends of the second coil electrodes RC may be connected one-to-one to fourth touch pads TP4 that are arranged in the pad connection area PD1. The third touch pads TP3 and the fourth touch pads TP4 may be disposed in third and fourth touch pad areas TPA3 and TPA4.

The touch sensing circuit 400 supplies the pen touch driving signals to the first coil electrodes TC from the leftmost to the rightmost in the pen touch sensing area PSA based on a pen touch driving frequency. Further, the touch sensing circuit 400 supplies the pen touch driving signals to the second coil electrodes RC from the uppermost to the lowermost in the pen touch sensing area PSA. In this case, the touch sensing circuit 400 may supply the pen touch driving signals simultaneously to the first coil electrodes TC arranged in the first direction (X-axis direction) and the second coil electrodes RC arranged in the second direction (Y-axis direction). Alternatively, the touch sensing circuit 400 may supply the pen touch driving signals to the first coil electrodes TC in order from the leftmost to the rightmost in the first direction (X-axis direction). Further, the touch sensing circuit 400 supplies the pen touch driving signals to the second coil electrodes RC in order from the uppermost to the lowermost in the second direction (Y-axis direction).

Alternatively, the touch sensing circuit 400 may group the first coil electrodes TC and the second coil electrodes RC into a preset number according to a touch driving firmware program, and output the pen touch driving signals to the first coil electrodes TC and the second coil electrodes RC of each group. In this case, the pen touch driving signals may be supplied as a plurality of pulse signals that are generated in a voltage level ranging from about –12 V to 12 V based on a driving voltage level of the firmware.

The touch sensing circuit 400 receives the pen touch sensing signals outputted from the first coil electrodes TC through the first output coil lines CTL2 and the third touch pads TP3. In addition, the touch sensing circuit 400 receives the pen touch sensing signals outputted from the second coil electrodes RC through the second output coil lines CRL2 and the fourth touch pads TP4. The touch sensing circuit 400 senses variations of the frequency and the amplitude of the pen touch sensing signals that are respectively outputted from the first and second coil electrodes TC and RC. To accomplish this, the touch sensing circuit 400 may include at least one driving signal supply unit that supplies the pen touch driving signal to the first and second coil electrodes TC and RC, and at least one signal analysis circuit unit that senses the variations of the frequency and the amplitude of the pen touch sensing signals. Particularly, the signal analysis circuit unit for sensing the amplitude variation may be configured to include a load capacitor, an envelope detector, an AC capacitor, an operational amplifier, and the like.

Figure 7:
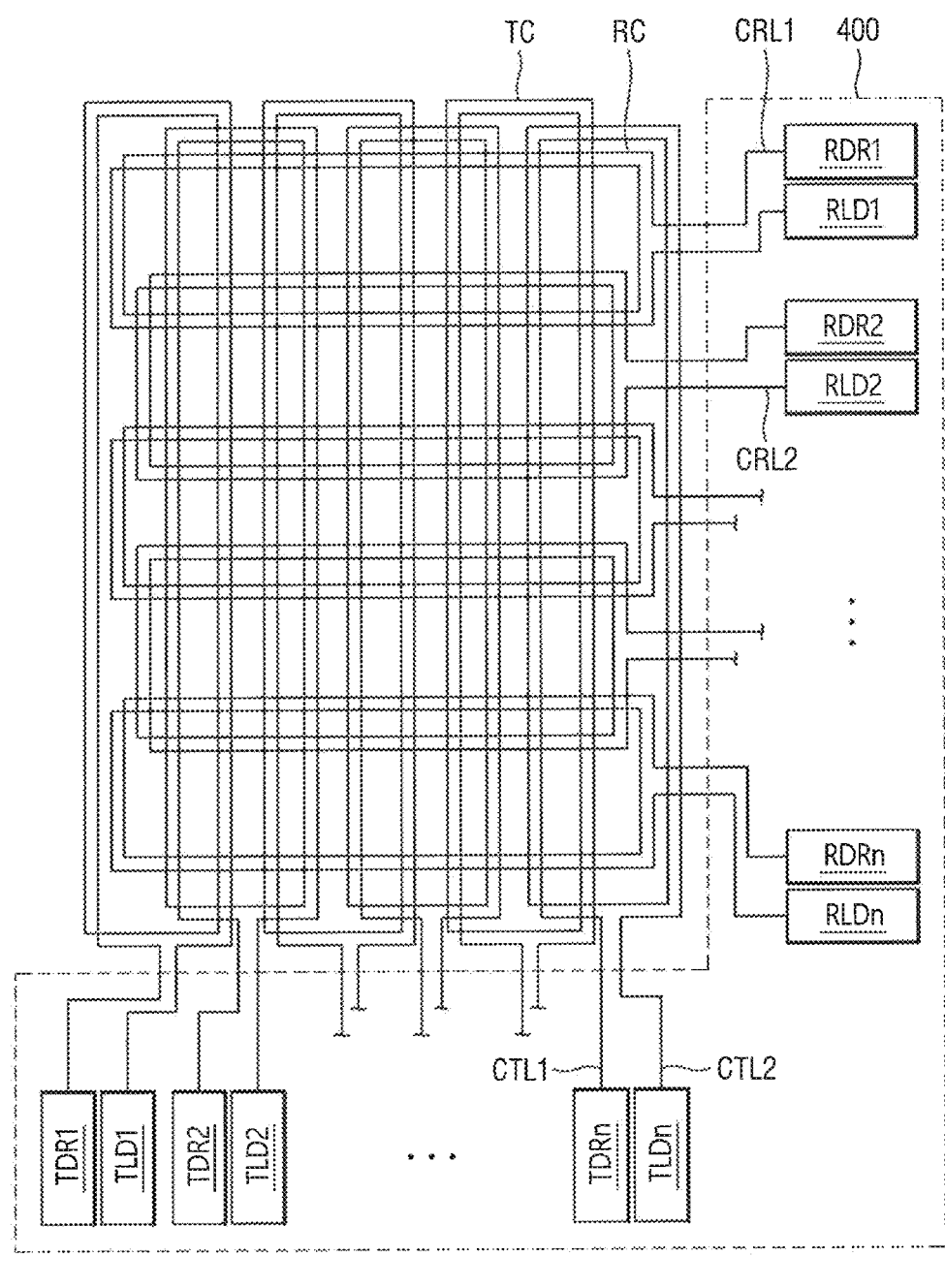
FIG. 7 is a layout diagram illustrating an electrical connection structure between the touch electrodes and the touch sensing circuit shown in FIGS. 3 and 6.

FIG. 7 is a layout diagram illustrating an electrical connection structure between the touch electrodes and the touch sensing circuit shown in FIGS. 3 and 6.

Referring to FIG. 7, the touch sensing circuit 400 may supply the pen touch driving signal to the first and second coil electrodes TC and RC of the pen touch sensing area PSA, and may receive the pen touch sensing signals through the first and second coil electrodes TC and RC to analyze the amplitude variations of the pen touch sensing signals. To accomplish this, the touch sensing circuit 400 may include one or more first driving signal supply units TDR1 to TDRn, one or more first signal analysis circuit units TLD1 to TLDn, one or more second driving signal supply units RDR1 to RDRn, and one or more second signal analysis circuit units RLD1 to RLDn.

Specifically, the touch sensing circuit 400 may include the plurality of first driving signal supply units TDR1 to TDRn that are connected one-to-one to one ends of the first coil electrodes TC arranged in the first direction (X-axis direction) in the pen touch sensing area PSA to supply the pen touch driving signals to the respective first coil electrodes TC. In addition, the touch sensing circuit 400 may include the plurality of first signal analysis circuit units TLD1 to TLDn that are connected one-to-one to the other ends of the first coil electrodes TC to analyze each of the pen touch sensing signals inputted through the first coil electrodes TC. For example, in FIG. 7, the first driving signal supply unit TDR1 may be connected to a first end of the leftmost first coil electrode TC and the first signal analysis circuit unit TLD1 may be connected to a second end of the leftmost first coil electrode TC.

In addition, the touch sensing circuit 400 may include the plurality of second driving signal supply units RDR1 to RDRn that are connected one-to-one to one ends of the second coil electrodes RC arranged in the second direction (Y-axis direction) in the pen touch sensing area PSA to supply the pen touch driving signals to the respective second coil electrodes RC. In addition, the touch sensing circuit 400 may include the plurality of second signal analysis circuit units RLD1 to RLDn that are connected one-to-one to the other ends of the second coil electrodes RC to analyze each of the pen touch sensing signals inputted through the second coil electrodes RC.

One ends of the pen touch electrodes, for example, the first coil electrodes TC, which are extended in the second direction (Y-axis direction) in the pen touch sensing area PSA, may be electrically connected to the respective first driving signal supply units TDR1 to TDRn corresponding one-to-one thereto to receive the pen touch driving signals from the respective first driving signal supply units TDR1 to TDRn. In addition, the other ends of the first coil electrodes TC may be electrically connected to the respective first signal analysis circuit units TLD1 to TLDn corresponding one-to-one thereto to output the pen touch sensing signals to the respective first signal analysis circuit units TLD1 to TLDn.

One ends of the pen touch electrodes, for example, the second coil electrodes RC, which are extended in the first direction (X-axis direction) in the pen touch sensing area PSA, may be electrically connected to the respective second driving signal supply units RDR1 to RDRn corresponding one-to-one thereto to receive the pen touch driving signals from the respective second driving signal supply units RDR1 to RDRn. In addition, the other ends of the second coil electrodes RC may be electrically connected to the respective second signal analysis circuit units RLD1 to RLDn corresponding one-to-one thereto to output the pen touch sensing signals to the respective second signal analysis circuit units RLD1 to RLDn.

The plurality of first driving signal supply units TDR1 to TDRn supply the pen touch driving signals to the first coil electrodes TC from the leftmost to the rightmost in the pen touch sensing area PSA. The plurality of second driving signal supply units RDR1 to RDRn supply the pen touch driving signals to the second coil electrodes RC from the uppermost to the lowermost in the pen touch sensing area PSA.

The plurality of first and second driving signal supply units TDR1 to TDRn and RDR1 to RDRn may be simultaneously driven to supply the pen touch driving signals simultaneously to the first coil electrodes TC and the second coil electrodes RC.

Alternatively, the plurality of first and second driving signal supply units TDR1 to TDRn and RDR1 to RDRn may be sequentially driven to supply the pen touch driving signals to the first coil electrodes TC in order from the leftmost to the rightmost in the first direction (X-axis direction). At this time, the pen touch driving signals may be supplied to the second coil electrodes RC in order from the uppermost to the lowermost in the second direction (Y-axis direction).

Each of the first and second signal analysis circuit units TLD1 to TLDn and RLD1 to RLDn senses the variations of the frequency and the amplitude of the pen touch sensing signal inputted from each of the first and second coil electrodes TC and RC that are connected one-to-one thereto.

Figure 8:
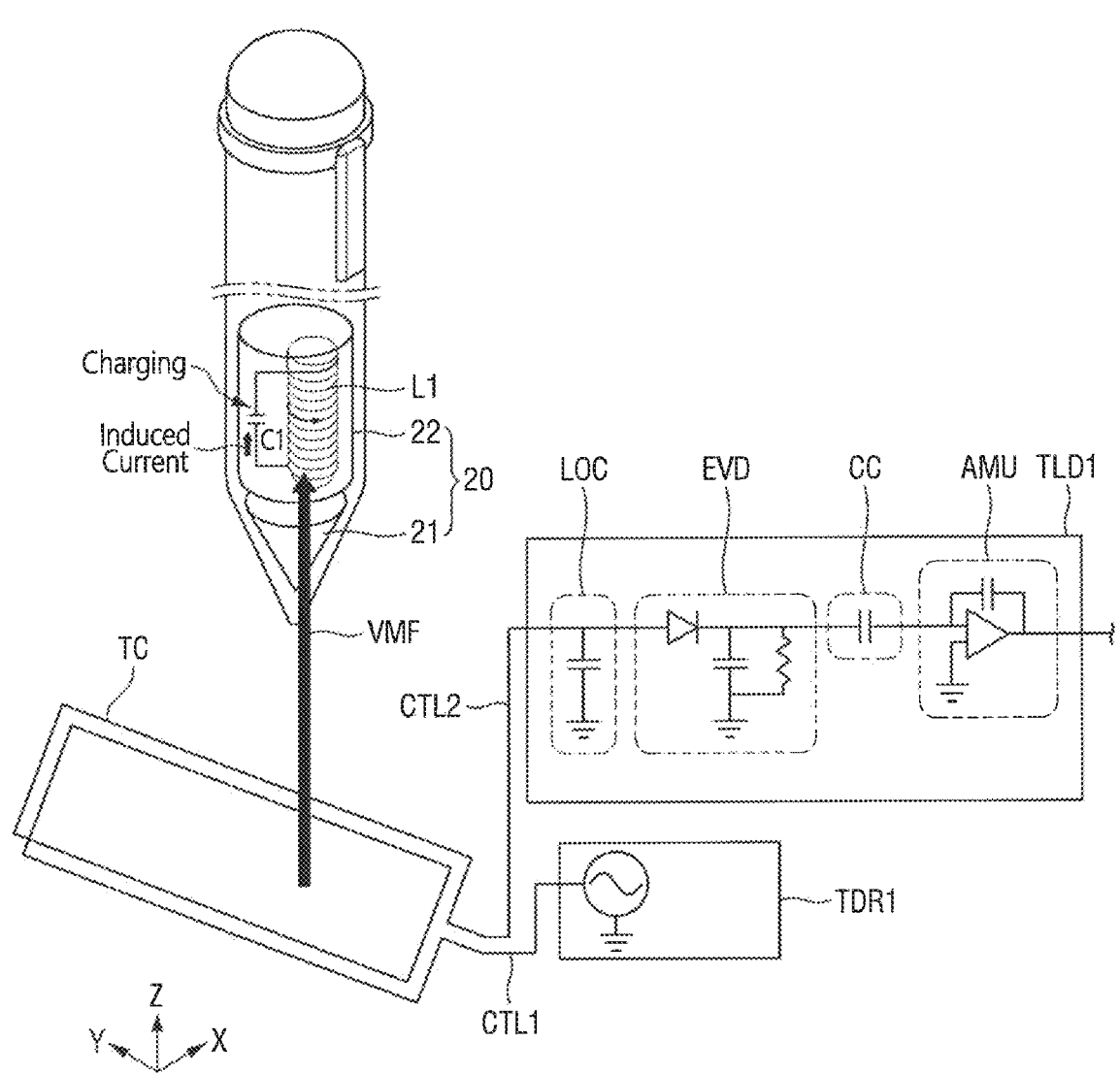
FIG. 8 is a configuration diagram for describing a touch driving operation of a touch sensing system and a charging operation of an electronic pen according to one embodiment of the present disclosure.

FIG. 8 is a configuration diagram for describing a touch driving operation of a touch sensing system and a charging operation of an electronic pen according to one embodiment of the present disclosure.

Referring to FIG. 8, the first and second driving signal supply units TDR1 to TDRn, and RDR1 to RDRn supply the pen touch driving signals to the first and second coil electrodes TC and RC through the respective first and second input coil lines CTL1 and CTL2.

The first and second driving signal supply units TDR1 to TDRn and RDR1 to RDRn may include at least one driving signal output module to generate and output the pen touch driving signal having a plurality of driving pulses. The pen touch driving signal supplied to each of the first and second coil electrodes TC and RC may be a sine wave, a pulse wave, or a ramp wave that has a predetermined frequency, but is not limited thereto. The frequency of the pen touch driving signal may correspond to a resonance frequency of an electronic pen 20. For example, the frequency of the touch driving signal may be the same as the resonance frequency of a resonance circuit unit 22 of the electronic pen 20, but is not limited thereto.

A current may flow through the first and second coil electrodes TC and RC in a coil formation direction, and a magnetic field may be generated in a direction opposite to the current flow direction.

The electronic pen 20 may include a conductive tip 21 and the resonance circuit unit 22. The conductive tip 21 may be disposed at one end of the electronic pen 20. Accordingly, when the electronic pen 20 touches the second touch sensing unit PSU, the conductive tip 21 may form a capacitance with at least one of the first and second coil electrodes TC and RC. The conductive tip 21 may be a dielectric including a metal material or conductive rubber, but is not limited thereto.

The resonant circuit unit 22 may include a coil L1 and a capacitor C1. The coil L1 receives a magnetic field VMF in the third direction (Z-axis direction), which has been induced from at least one of the first and second coil electrodes TC and RC, to generate an induced current. The induced current flowing through the resonant circuit unit 22 may charge the capacitor C1. For example, an LC resonant frequency of the electronic pen 20 may be determined based on the capacitance of the capacitor C1 and the inductance of the coil L1. In particular, the coil L1 of the electronic pen 20 may generate an induced current, and the induced current may charge the capacitor C1. Accordingly, the electromotive force of the capacitor C1 may increase during the charging period of the coil L1.

As the electromotive force of the capacitor C1 of the electronic pen 20 increases by the charging operation of the electronic pen 20, at least one coil electrode of the first and second coil electrodes TC and RC, which is located to correspond to the electronic pen 20, has a decreased current amount and voltage level. Accordingly, each of the first and second signal analysis circuit units TLD1 to TLDn and RLD1 to RLDn may receive a pen touch sensing signal of a specific frequency from each of the first and second coil electrodes TC and RC, and detect a pen touch sensing signal having a low amplitude modulated, thereby sensing a touch of the electronic pen 20.

In order to sense the amplitude variation of the pen touch sensing signal, each of the first and second signal analysis circuit units TLD1 to TLDn and RLD1 to RLDn may include at least one load capacitor LOC, an envelope detector EVD, an AC capacitor CC, and an operational amplifier AMU.

The load capacitor LOC is connected in parallel with the first and second coil electrodes TC and RC to stabilize the output current of each of the coil electrodes TC and RC. The envelope detector EVD is connected in series with the output terminal of each of the first and second coil electrodes TC and RC to detect the amplitude variation of the output current outputted through the load capacitor LOC. In other words, the envelope detector EVD outputs an amplitude decrement of the pen touch sensing signal applied to the load capacitor LOC, in other words, an amplitude decrement detection signal according to an envelope variation.

As an electrostatic element connected in series with the envelope detector EVD, the AC capacitor CC prevents a reversal of the amplitude decrement detection signal according to the envelope variation. Further, the operational amplifier AMU is connected in series with the envelope detector EVD and the AC capacitor CC to amplify and output the amplitude decrement detection signal with respect to the pen touch sensing signal detected through the envelope detector EVD.

The touch sensing circuit 400 may detect the touch and the touch position of the electronic pen 20 and generate touch position coordinates according the amplitude decrement detection signal with respect to the pen touch sensing signal outputted through the first and second signal analysis circuit units TLD1 to TLDn and RLD1 to RLDn.

Figure 9:
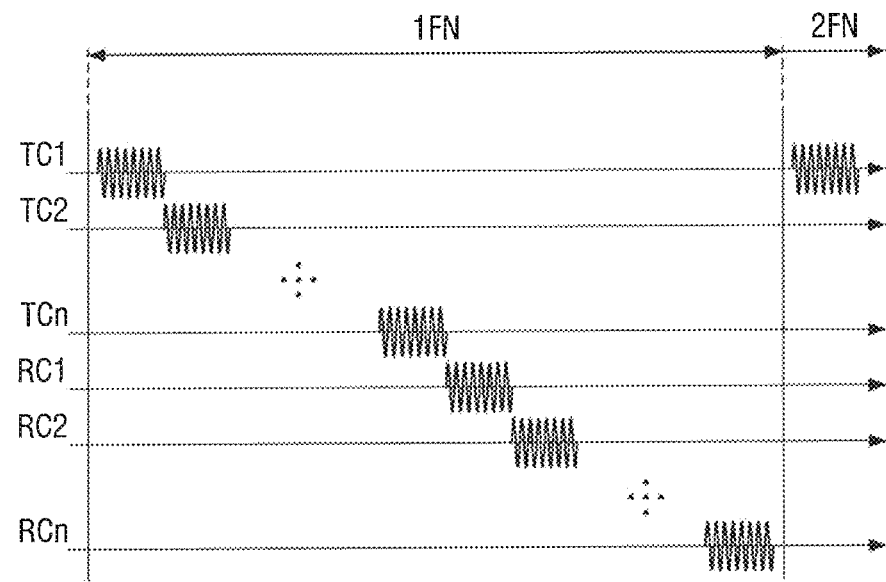
FIG. 9 is a timing diagram illustrating a touch sensing method of a second touch sensing unit according to one embodiment of the present disclosure.

FIG. 9 is a timing diagram illustrating a touch sensing method of a second touch sensing unit according to one embodiment of the present disclosure.

Referring to FIG. 9, the first and second driving signal supply units TDR1 to TDRn and RDR1 to RDRn of the touch sensing circuit 400 may be sequentially driven during at least one frame period 1FN to sequentially supply the pen touch driving signals to the first coil electrodes to TC1 to TCn, and sequentially supply the pen touch driving signals to the second coil electrodes RC1 to RCn.

Specifically, the plurality of first and second driving signal supply units TDR1 to TDRn and RDR1 to RDRn may supply the pen touch driving signals to the first coil electrodes TC in order from the first coil electrode TC1 disposed at the leftmost side to the $n^{th}$ coil electrode TCn at the rightmost side in the first direction (X-axis direction) during the at least one frame period 1FN. In addition, the plurality of first and second driving signal supply units TDR1 to TDRn and RDR1 to RDRn may supply the pen touch driving signals to the second coil electrodes RC in order from the second coil electrode RC1 disposed at the uppermost side to the $n^{th}$ coil electrode RCn disposed at the lowermost side in the second direction (Y-axis direction).

The first and second signal analysis circuit units TLD1 to TLDn and RLD1 to RLDn sense the variations of the frequency and the amplitude of the pen touch sensing signals that are sequentially inputted from the first and second coil electrodes TC and RC connected one-to-one thereto. In other words, each of the first and second signal analysis circuit units TLD1 to TLDn and RLD1 to RLDn detects the amplitude variations of the pen touch sensing signals sequentially inputted and detects the touch and the touch position of the electronic pen 20 according to the amplitude decrement detection signal with respect to the pen touch sensing signal.

Figure 10:
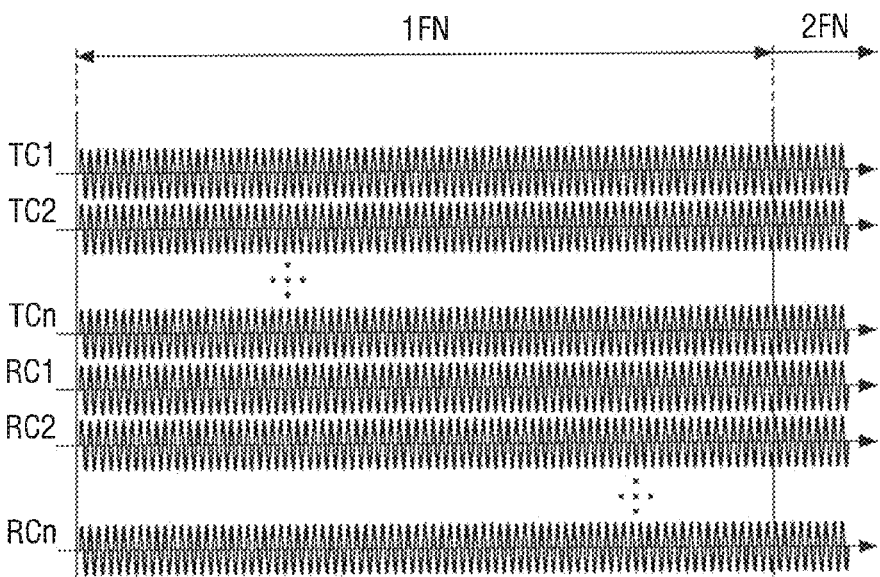
FIG. 10 is a timing diagram illustrating another touch sensing method of a second touch sensing unit according to one embodiment of the present disclosure.

FIG. 10 is a timing diagram illustrating another touch sensing method of a second touch sensing unit according to one embodiment of the present disclosure.

Referring to FIG. 10, the first and second driving signal supply units TDR1 to TDRn and RDR1 to RDRn are simultaneously driven during the at least one frame period 1FN to supply pen touch driving signals simultaneously to the first coil electrodes TC1 to TCn and the second coil electrodes RC1 to RCn.

The first and second signal analysis circuit units TLD1 to TLDn and RLD1 to RLDn sense amplitude variations of pen touch sensing signals, which are simultaneously inputted from the respective first and second coil electrodes TC and RC connected one-to-one thereto during a unit of the at least one frame period 1FN. In other words, the first and second signal analysis circuit units TLD1 to TLDn and RLD1 to RLDn detect the amplitude variations of the pen touch sensing signals simultaneously inputted and detect the touch and the touch position of the electronic pen 20 according to the amplitude decrement detection signal of the pen touch sensing signal.

Figure 11:
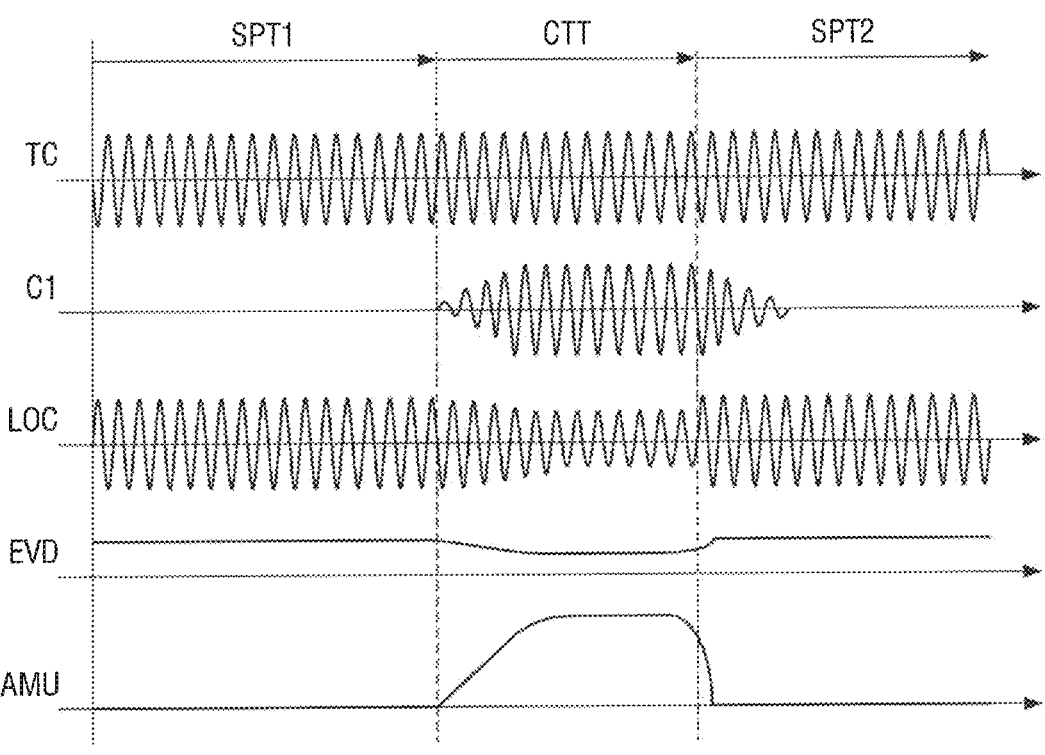
FIG. 11 is a waveform diagram in a touch input signal modulation process of the touch sensing circuit shown in FIG. 8.

FIG. 11 is a waveform diagram in a touch input signal modulation process of the touch sensing circuit shown in FIG. 8.

Referring to FIG. 11, in the pulse signals input period (SPT1), the first and second driving signal supply units TDR1 to TDRn and RDR1 to RDRn may supply, as the pen touch driving signals, a plurality of pulse signals generated at a voltage level ranging from about −12 V to 12 V to the first and second coils electrodes TC1 to TCn and RC1 to RCn connected one-to-one thereto.

In the touch detection period (CTT), when the electronic pen 20 touches the second touch sensing unit PSU, the resonance circuit unit 22 of the electronic pen 20 forms a capacitance with at least one of the first and second coil electrodes TC and RC. Accordingly, the coil L1 of the resonance circuit unit 22 generates an induced current. The induced current flowing through the resonance circuit unit 22 is charged in the capacitor C1.

As the induced current of the coil L1 is charged in the capacitor C1 of the electronic pen 20, the amplitude of the pen touch sensing signal, which is applied to at least one signal analysis circuit unit of the signal analysis circuit units TLD1 to TLDn and RLD1 to RLDn, is decreased. For example, the amplitude of the pen touch sensing signal, which is applied to the load capacitor LOC of any one signal analysis circuit unit of the first signal analysis circuit units TLD1 to TLDn, may be decreased. Accordingly, the envelope detector EVD may output the amplitude decrement detection signal according to the amplitude decrement of the pen touch sensing signal applied to the load capacitor LOC, in other words, the envelope variation. The operational amplifier AMU may amplify and output the amplitude decrement detection signal of the pen touch sensing signal detected by the envelope detector EVD, so that the touch sensing circuit 400 may detect the touch and the touch position of the electronic pen 20. The subsequent SPT2 period is a touch non-sensing period.

Figure 12:
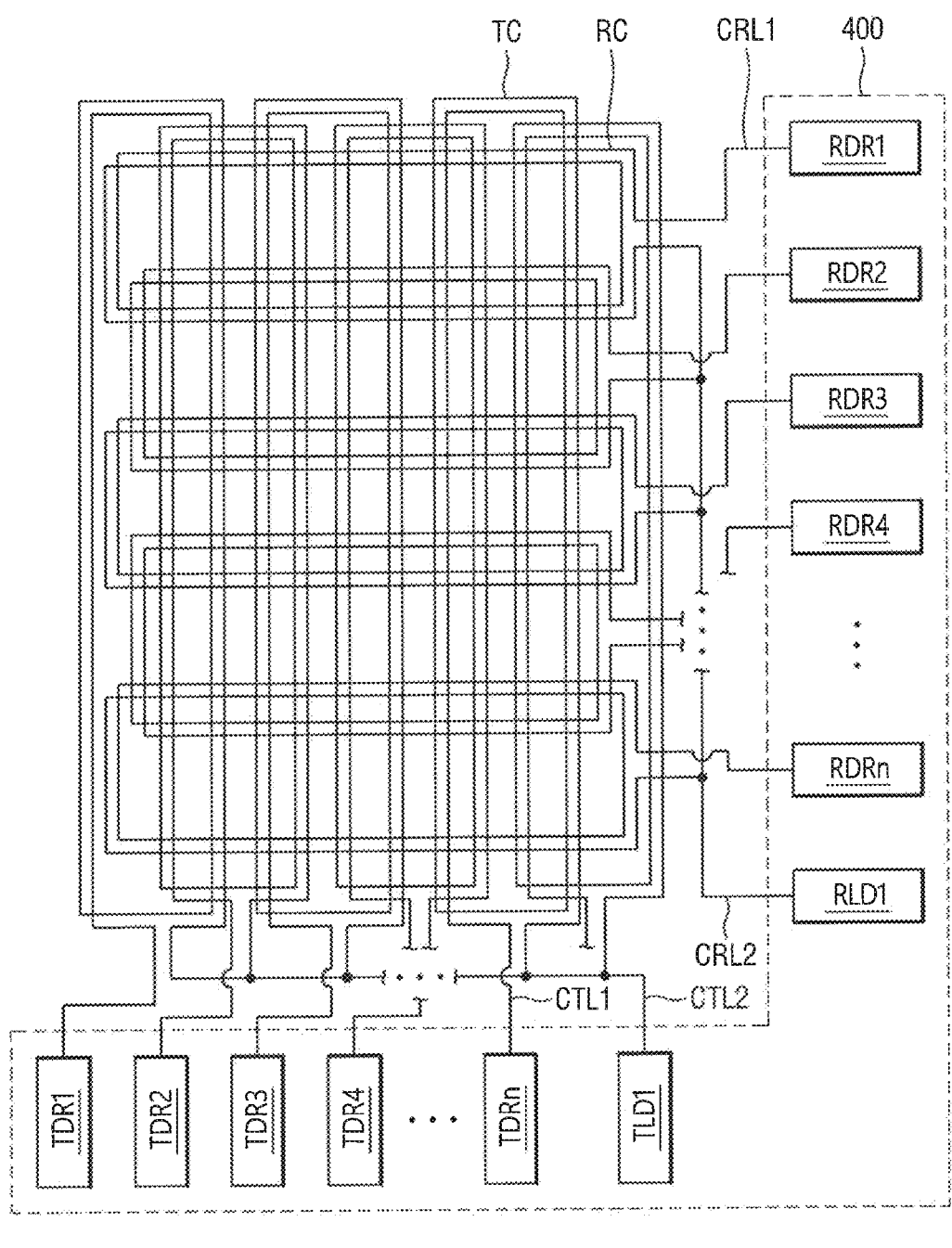
FIG. 12 is a layout diagram illustrating an electrical connection structure between touch electrodes and a touch sensing circuit according to another embodiment of the present disclosure.

FIG. 12 is a layout diagram illustrating an electrical connection structure between touch electrodes and a touch sensing circuit according to another embodiment of the present disclosure.

Referring to FIG. 12, the touch sensing circuit 400 may supply pen touch driving signals sequentially to the first and second coil electrodes TC and RC of the pen touch sensing area PSA, and may analyze variations of an amplitude and a frequency of pen touch sensing signals sequentially outputted through the first and second coil electrodes TC and RC. To accomplish this, the touch sensing circuit 400 may include the plurality of first driving signal supply units TDR1 to TDRn, one first signal analysis circuit unit TLD1, the plurality of second driving signal supply units RDR1 to RDRn, and one second signal analysis circuit unit RLD1.

Specifically, the touch sensing circuit 400 may include the plurality of first driving signal supply units TDR1 to TDRn that are connected one-to-one to the first coil electrodes TC extended in the second direction (Y-axis direction) in the pen touch sensing area PSA to supply the pen touch driving signals sequentially to the first coil electrodes TC. In addition, the touch sensing circuit 400 may include one first signal analysis circuit unit TLD1 that is connected to all of the first coil electrodes TC to analyze the pen touch sensing signals inputted through the first coil electrodes TC.

In addition, the touch sensing circuit 400 may include the plurality of second driving signal supply units RDR1 to RDRn that are connected one-to-one to the second coil electrodes RC extended in the first direction (X-axis direction) in the pen touch sensing area PSA to supply the pen touch driving signals sequentially to the second coil electrodes RC. In addition, the touch sensing circuit 400 may include one second signal analysis circuit unit RLD1 that is connected to all of the second coil electrodes RC to analyze the pen touch sensing signals inputted through the second coil electrodes RC.

Figure 13:
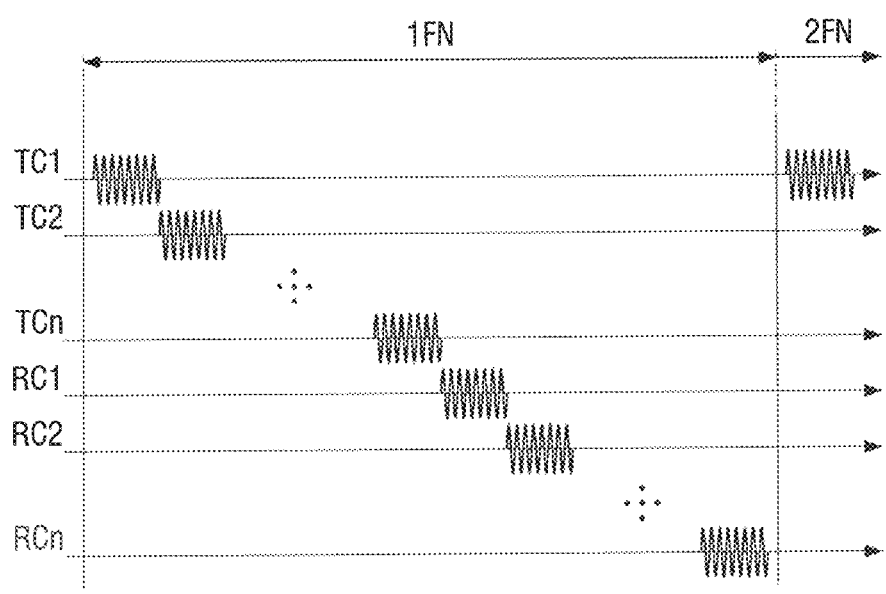
FIG. 13 is a timing diagram illustrating a touch sensing method of the touch sensing circuit shown in FIG. 12.

FIG. 13 is a timing diagram illustrating a touch sensing method of the touch sensing circuit shown in FIG. 12.

Referring to FIG. 13, the first and second driving signal supply units TDR1 to TDRn and RDR1 to RDRn may be sequentially driven during the at least one frame period 1FN to sequentially supply the pen touch driving signals to the first coil electrodes TC1 to TCn and also sequentially supply the pen touch driving signals to the second coil electrodes RC1 to RCn.

Specifically, the plurality of first and second driving signal supply units TDR1 to TDRn and RDR1 to RDRn may supply the pen touch driving signals to the first coil electrodes TC in order from the first coil electrode TC1 disposed at the leftmost side to the $n^{th}$ coil electrode TCn disposed at the rightmost side in the first direction (X-axis direction). In addition, the plurality of first and second driving signal supply units TDR1 to TDRn and RDR1 to RDRn may supply the pen touch driving signals to the second coil electrodes RC in order from the second coil electrode RC1 disposed at the uppermost side to the $n^{th}$ coil electrode RCn disposed at the lowermost side in the second direction (Y-axis direction).

The one first signal analysis circuit unit TLD1 senses the amplitude variations of the pen touch sensing signals continuously inputted through the respective first coil electrodes TC. In other words, the one first signal analysis circuit unit TLD1 may detect the amplitude variations of the pen touch sensing signals continuously inputted through the respective first coil electrodes TC, and detect a touch start and a touch of the electronic pen 20 according to the amplitude decrement detection signal of the pen touch sensing signal. In this case, although the one first signal analysis circuit unit TLD1 may detect only the touch start and the touch of the electronic pen 20, the number of the first signal analysis circuit units TLD1 may be decreased to one.

Similarly, the one second signal analysis circuit unit RLD1 may also detect the amplitude variations of the pen touch sensing signals continuously inputted through the second coil electrodes RC, and detect the touch and the touch position of the electronic pen 20 according to the amplitude decrement detection signal of the pen touch sensing signal. In this case, the one second signal analysis circuit unit RLD1 may detect only the touch start and the touch of the electronic pen 20.

Figure 14:
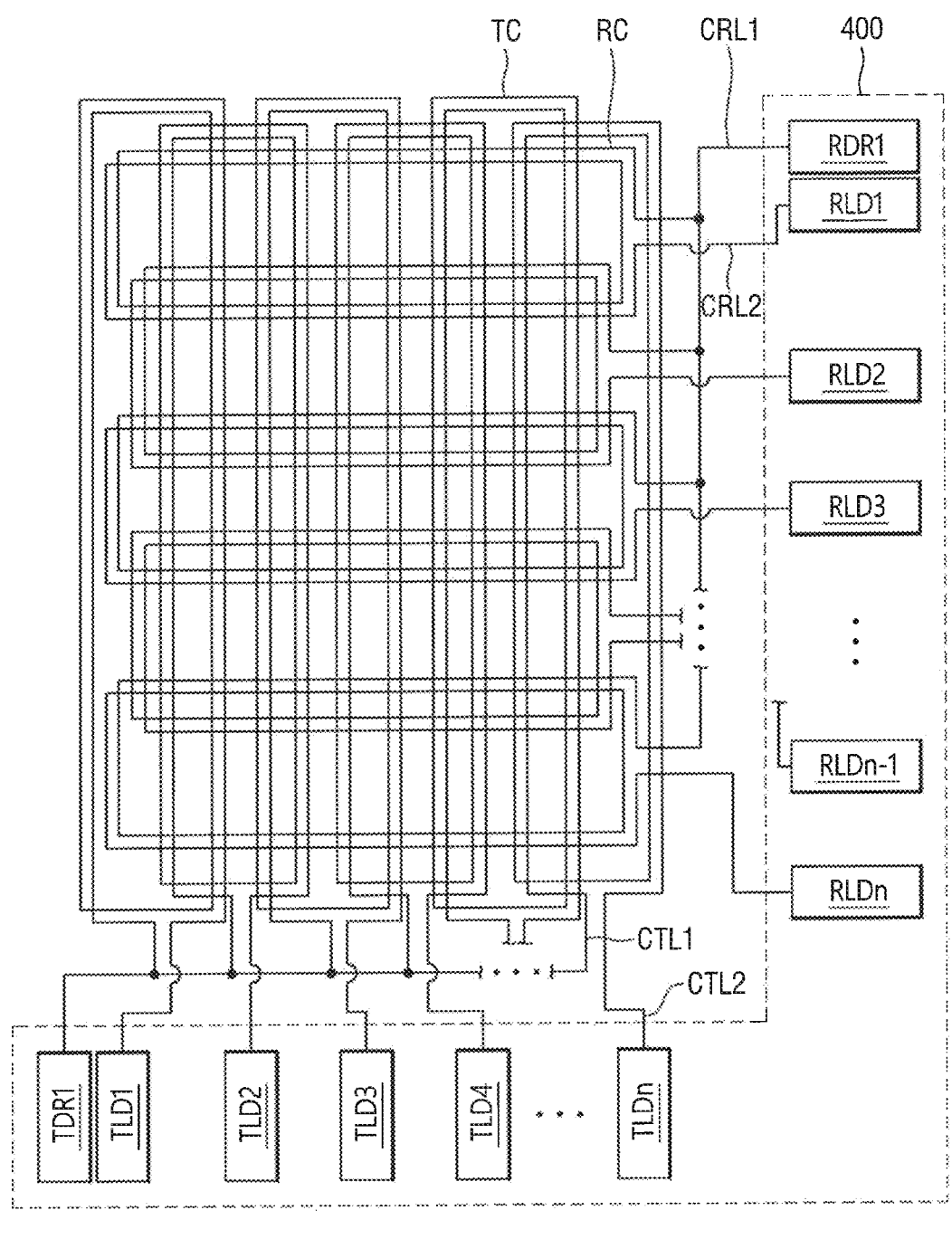
FIG. 14 is a layout diagram illustrating an electrical connection structure between touch electrodes and a touch sensing circuit according to still another embodiment of the present disclosure.

FIG. 14 is a layout diagram illustrating an electrical connection structure between touch electrodes and a touch sensing circuit according to still another embodiment of the present disclosure.

Referring to FIG. 14, the touch sensing circuit 400 may supply the pen touch driving signals simultaneously to the first and second coil electrodes TC and RC in the pen touch sensing area PSA, and may analyze variations of an amplitude and a frequency, and the like of the pen touch sensing signals outputted through the respective first and second coil electrodes TC and RC. To accomplish this, the touch sensing circuit 400 may include the one first driving signal supply unit TDR1, the plurality of first signal analysis circuit units TLD1 to TLDn, the one second driving signal supply unit RDR1, and the plurality of second signal analysis circuit units RLD1 to RLDn.

Specifically, the touch sensing circuit 400 may include the one first driving signal supply unit TDR1, which is connected to all of the first coil electrodes TC extended in the second direction (Y-axis direction) in the pen touch sensing area PSA, to supply the pen touch driving signals simultaneously to the first coil electrodes TC. Further, the touch sensing circuit 400 may include the plurality of first signal analysis circuit units TLD1 to TLDn, which are connected one-to-one to the first coil electrodes TC, to analyze the pen touch sensing signals inputted from the respective first coil electrodes TC.

Further, the touch sensing circuit 400 may include the one second driving signal supply unit RDR1, which is connected to all of the second coil electrodes RC extended in the first direction (X-axis direction) in the pen touch sensing area PSA, to supply the pen touch driving signals simultaneously to the second coil electrodes RC. Further, the touch sensing circuit 400 may include the plurality of second signal analysis circuit units RLD1 to RLDn, which are connected one-to-one to the second coil electrodes RC, to analyze the pen touch sensing signals inputted from the respective second coil electrodes RC.

Figure 15:
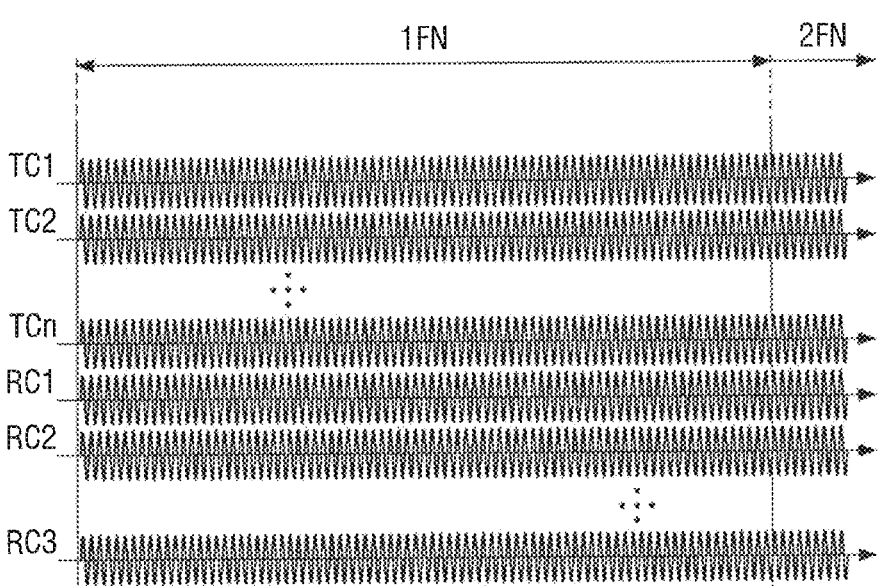
FIG. 15 is a timing diagram illustrating a touch sensing method of the touch sensing circuit shown in FIG. 14.

FIG. 15 is a timing diagram illustrating a touch sensing method of the touch sensing circuit shown in FIG. 14.

Referring to FIG. 15, the one first driving signal supply unit TDR1 may supply the pen touch driving signals simultaneously to the first coil electrodes TC1 to TCn during the at least one frame period 1FN. In addition, the one second driving signal supply unit RDR1 may supply the pen touch driving signals simultaneously to the second coil electrodes RC1 to RCn during the at least one frame period 1FN.

The first and second signal analysis circuit units TLD1 to TLDn and RLD1 to RLDn may sense the amplitude variations of the pen touch sensing signals that are simultaneously inputted from the respective first and second coil electrodes TC and RC, which are connected one-to-one to the first and second signal analysis circuit units TLD1 to TLDn and RLD1 to RLDn, during the at least one frame period 1FN. In other words, the first and second signal analysis circuit units TLD1 to TLDn and RLD1 to RLDn may detect the touch position of the electric pen 20 according to the amplitude decrement detection signal of each pen touch sensing signal by detecting the amplitude variations of the pen touch sensing signals simultaneously inputted.

By providing the one first driving signal supply unit TDR1 and the one second driving signal supply unit RDR1, the pen touch driving signals may be simultaneously supplied to the first coil electrodes TC and to the second coil electrodes RC. However, it is possible to reduce the overall number of the driving signal supply units. On the other hand, the first and second signal analysis circuit units TLD1 to TLDn and RLD1 to RLDn may be provided to correspond one-to-one to the first and second coil electrodes TC and RC, thereby detecting the touch position of the electronic pen 20.

Figure 16:
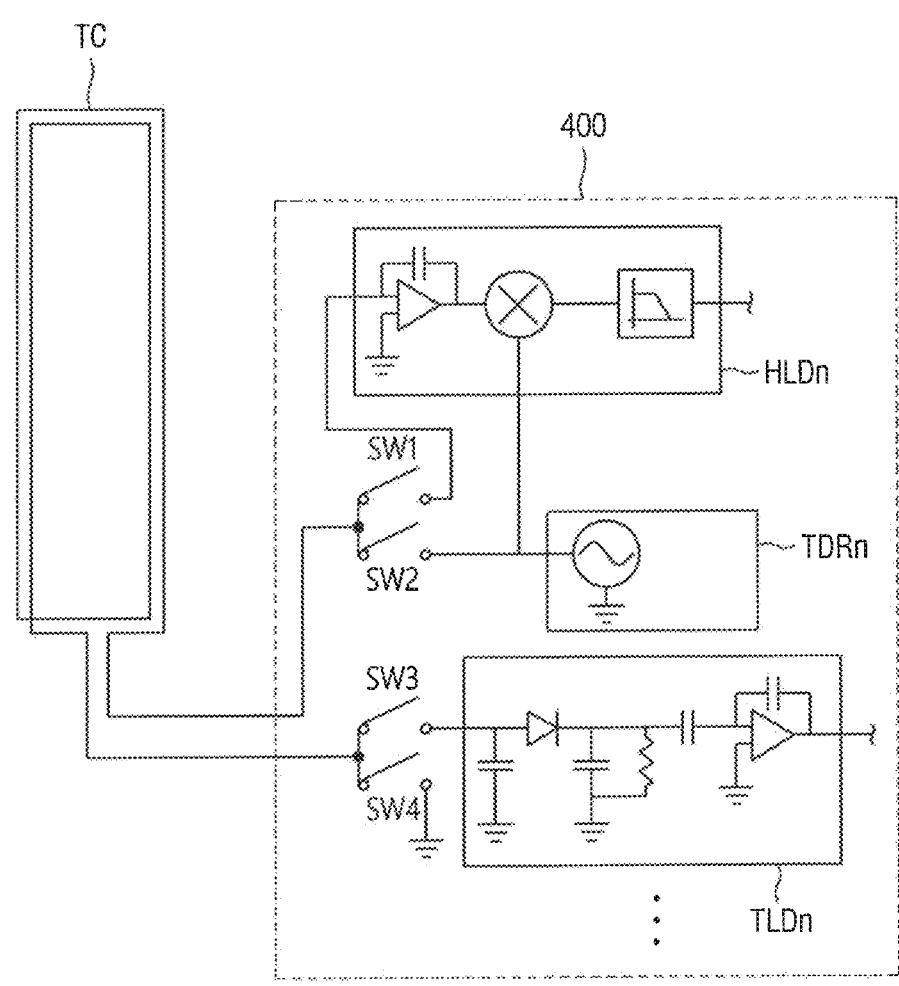
FIG. 16 is a configuration diagram for describing a touch driving operation of a touch sensing system and a charging/discharging operation of an electronic pen according to still another embodiment of the present disclosure.

FIG. 16 is a configuration diagram for describing a touch driving operation of a touch sensing system and a charging/discharging operation of an electronic pen according to still another embodiment of the present disclosure.

Referring to FIG. 16, the first and second driving signal supply units TDR1 to TDRn and RDR1 to RDRn may supply pen touch driving signals to the first and second coil electrodes TC and RC through the first and second input coil lines CTL1 and CTL2, respectively.

At least one first signal analysis circuit unit TLDn and at least one second signal analysis circuit unit RLDn detect a touch start of the electronic pen 20 by sensing a variation (e.g., an amplitude variation) of the pen touch sensing signal of the first and second coil electrodes TC and RC according to a charge amount of the electronic pen 20 during a touch start detection period of the electronic pen 20.

The touch sensing circuit 400 may further include a plurality of third signal analysis circuit units HLDn that detect a touch position of the electronic pen 20 by sensing the variation (e.g., the amplitude variation) of the pen touch sensing signal of the first and second coil electrodes TC and RC according to a discharge amount of the electronic pen 20 during a discharging period of the electronic pen 20.

The third signal analysis circuit units HLDn detect the touch position of the electronic pen 20 by sensing a magnitude variation of the pen touch sensing signal that is outputted through each of the first and second coil electrodes TC and RC during a touch position detection period of the electronic pen 20 after the touch of the electronic pen 20 is detected. To accomplish this, the third signal analysis circuit units HLDn may include at least one signal amplifier and a signal comparator.

Each of the third signal analysis circuit units HLDn may compare, with a reference signal of a preset threshold, the pen touch sensing signal inputted through each of the first and second coil electrodes TC and RC during each discharging period of the electronic pen 20 in the touch position detection period of the electronic pen 20. In addition, if the voltage level of the pen touch sensing signal sensed during the discharging period is greater than or less than the preset threshold, it may be determined that a touch has been made by the electronic pen 20. Accordingly, each of the third signal analysis circuit units HLDn may determine the touch position according to the arrangement positions of the coil electrodes determined to be touched among the first and second coil electrodes TC and RC.

In addition, the touch sensing circuit 400 may include a plurality of first switches SW1, which are arranged between each of the first and second coil electrodes TC and RC and the third signal analysis circuit unit HLDn to electrically connect the first and second coil electrodes TC and RC to the corresponding third signal analysis circuit units HLDn during each discharging period of the electronic pen 20 in the touch position detection period of the electronic pen 20. In addition, the touch sensing circuit 400 may further include a plurality of second switches SW2 that are arranged between the first and second coil electrodes TC and RC and at least one of the first and second signal analysis circuit units TLDn and RLDn to electrically connect the first and second coil electrodes TC and RC to at least one of the first and second signal analysis circuit units TLDn and RLDn during each charging period of the electronic pen 20 in the touch start detection period and the touch position detection period of the electronic pen 20.

In addition, the touch sensing circuit 400 may include a plurality of third switches SW3 that are arranged between the first and second coil electrodes TC and RC and at least one of the first and second signal analysis circuit units TLDn and RLDn to electrically connect the first and second coil electrodes TC and RC to at least one of the first and second signal analysis circuit units TLDn and RLDn during each touch start detection period of the electronic pen 20. In addition, the touch sensing circuit 400 may further include a plurality of fourth switches SW4 that are arranged between the first and second coil electrodes TC and RC and a ground or low potential voltage source to electrically connect the first and second coil electrodes TC and RC to the ground or low potential voltage source during each touch position detection period of the electronic pen 20.

Figure 17:
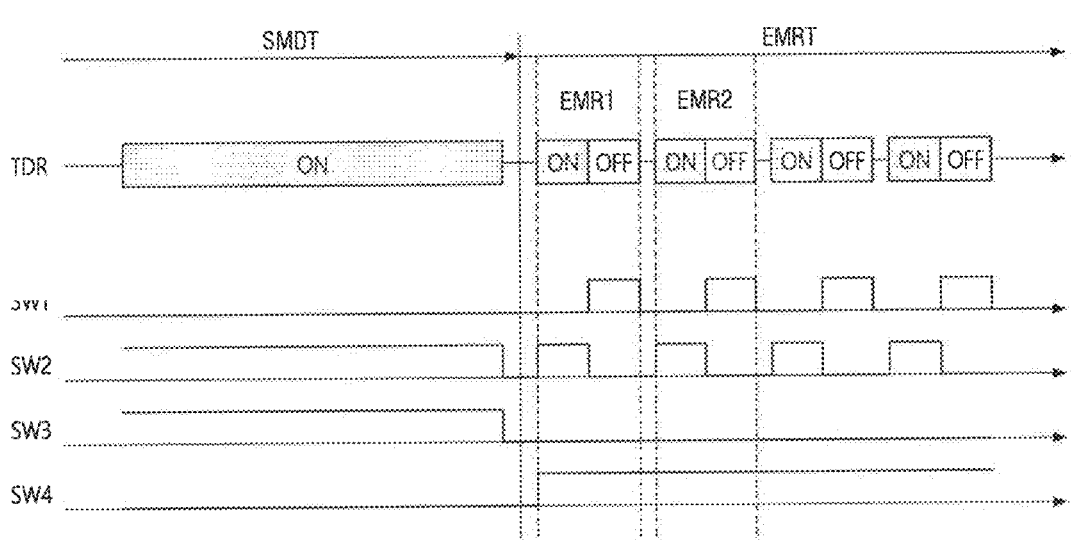
FIG. 17 is a timing diagram illustrating a touch sensing method of the touch sensing circuit shown in FIG. 16.
Figure 18:
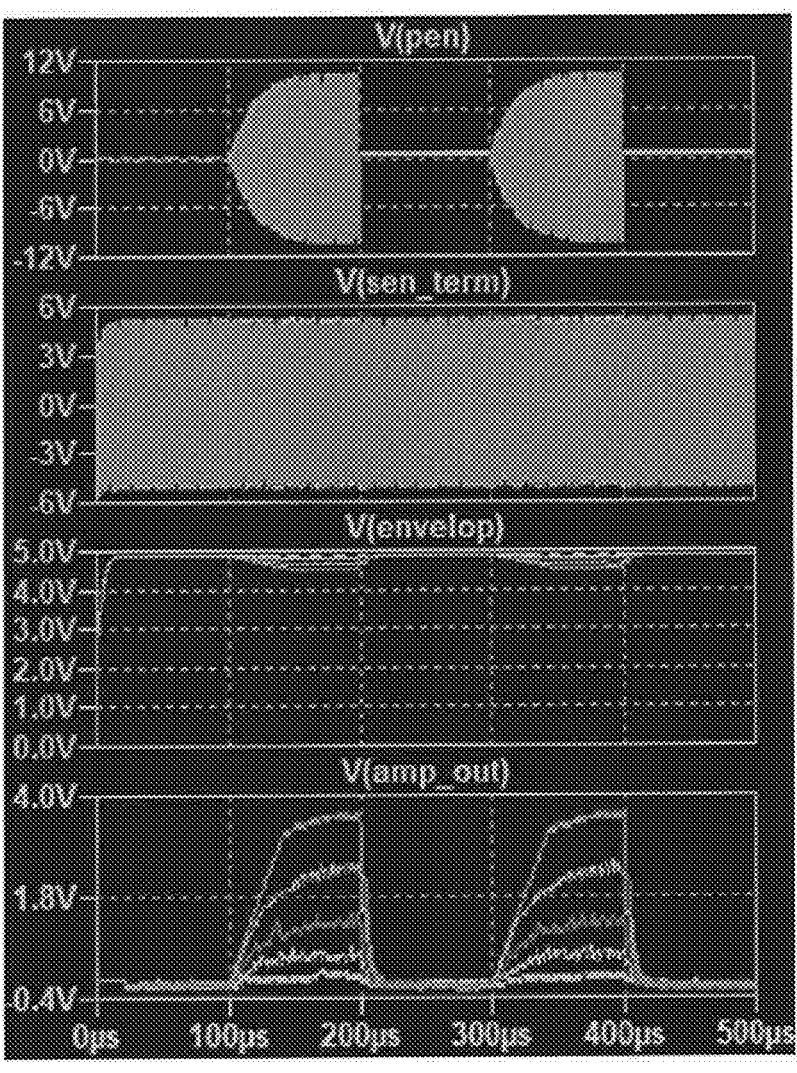
FIG. 18 is a simulation waveform diagram in a touch input signal modulation process of the touch sensing circuit shown in FIG. 16.

FIG. 17 is a timing diagram illustrating a touch sensing method of the touch sensing circuit shown in FIG. 16. FIG. 18 is a simulation waveform diagram in a touch input signal modulation process of the touch sensing circuit shown in FIG. 16.

Referring to FIGS. 17 and 18, the touch sensing circuit 400 may supply the pen touch driving signal to each of the first and second coil electrodes TC and RC and analyze the pen touch sensing signals during each of a touch start detection period SMDT and a touch position detection period EMRT of the electronic pen 20.

Specifically, the touch sensing circuit 400 turns off the first and fourth switches SW1 and SW4 and turns on the second and third switches SW2 and SW3 during the touch start detection period SMDT. Accordingly, as shown in FIG. 18, the touch sensing circuit 400 supplies a pen touch driving signal V(sen_term) from the first and second driving signal supply units TDRn and RDRn to one ends of the first and second coil electrodes TC and RC during the touch start detection period SMDT. When the electronic pen 20 touches the second touch sensing unit PSU, the resonance circuit unit 22 of the electronic pen 20 forms a capacitance with at least one of the first and second coil electrodes TC and RC. Accordingly, the coil L1 of the resonance circuit unit 22 generates an induced current V(pen). The induced current V(pen) flowing through the resonance circuit unit 22 is charged in the capacitor C1.

As the induced current V(pen) of the coil L1 is charged in the capacitor C1 of the electronic pen 20, the amplitude of the pen touch sensing signal, which is applied to at least one signal analysis circuit unit of the signal analysis circuit units TLD1 to TLDn and RLD1 to RLDn, is decreased. For example, the amplitude of the pen touch sensing signal, which is applied to the load capacitor LOC of any one signal analysis circuit unit of the first signal analysis circuit units TLD1 to TLDn, may be decreased. Accordingly, the envelope detector EVD may output the amplitude decrement detection signal V(envelop) according to the amplitude decrement of the pen touch sensing signal applied to the load capacitor LOC, in other words, the envelope variation. The operational amplifier AMU may amplify and output the amplitude decrement detection signal V(envelop) of the pen touch sensing signal detected by the envelope detector EVD, so that the touch sensing circuit 400 may detect the touch and the touch position of the electronic pen 20.

In addition, the touch sensing circuit 400 outputs the pen touch sensing signals, which are outputted from the other ends of the first and second coil electrodes TC and RC, to the first and second signal analysis circuit units TLDn and RLDn. Accordingly, the touch sensing circuit 400 may determine the touch start and the touch of the electronic pen 20 according to an amplitude variation V(amp_out) of the pen touch sensing signals analyzed by the first and second signal analysis circuit units TLDn and RLDn. The touch start detection period SMDT may be set as at least one frame period until the time when the touch start of the electronic pen 20 is detected.

Figure 19:
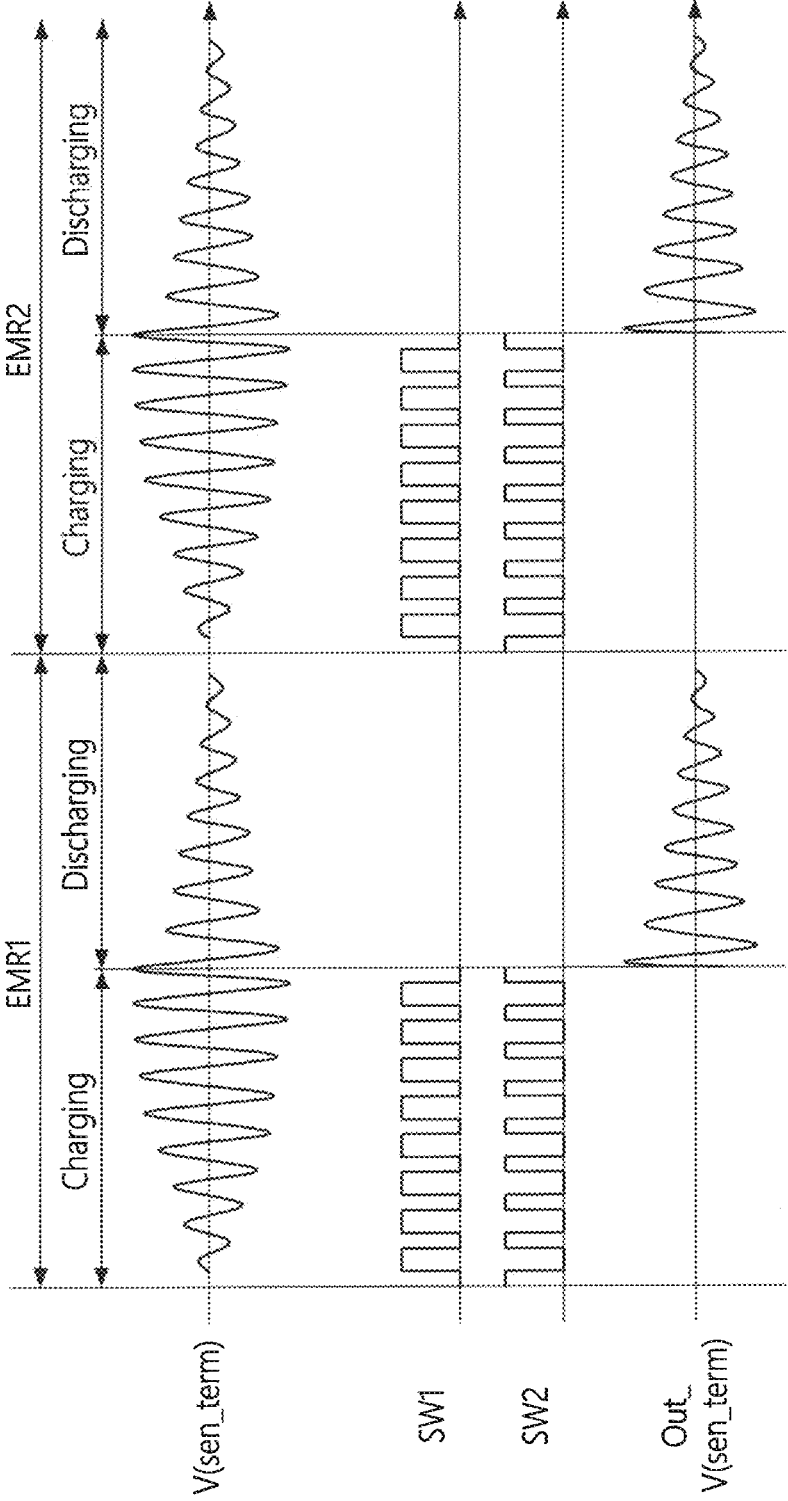
FIG. 19 is a waveform diagram of a pen touch driving signal, a differential sensing signal, and an electromotive force applied to an electronic pen during the touch position detection period of FIG. 16.

FIG. 19 is a waveform diagram of a pen touch driving signal, a differential sensing signal, and an electromotive force applied to an electronic pen during the touch position detection period of FIG. 16.

Referring to FIG. 19 in conjunction with FIG. 17, the touch sensing circuit 400 alternately and repeatedly turns on or turns off the first and second switches SW1 and SW2 to be in different states during predetermined charging/discharging periods EMR1 and EMR2 so that charging and discharging operations of the electronic pen 20 may be alternately repeated during the touch position detection period EMRT. Accordingly, during the charging period of the electronic pen 20 in the touch position detection period EMRT, the pen touch driving signals from the first and second driving signal supply units TDRn and RDRn are supplied to one ends of the first and second coil electrodes TC and RC. Due to an electromagnetic force between the first and second coil electrodes TC and RC and the coil L1 of the electronic pen 20, an electromotive force of the capacitor C1 and the coil L1 of the electronic pen 20 increases, and the capacitor C1 is charged.

During the discharging period of the electronic pen 20 in the touch position detection period EMRT, the pen touch sensing signal Out_V(sen_term) outputted through each of the first and second coil electrodes TC and RC is applied to each of the third signal analysis circuit units HLDn. Each of the third signal analysis circuit units HLDn compares a voltage level of the pen touch sensing signal V(sen_term), which is inputted through each of the first and second coil electrodes TC and RC during each discharging period of the electronic pen 20, with a reference voltage level of a threshold. In addition, when the voltage level of the pen touch sensing signal Out_V(sen_term) is greater than or less than the preset threshold, it may be determined that a touch has been made by the electronic pen 20. Each of the third signal analysis circuit units HLDn may determine a touch position according to the arrangement positions of the coil electrodes determined to be touched among the first and second coil electrodes TC and RC.

Figure 20:
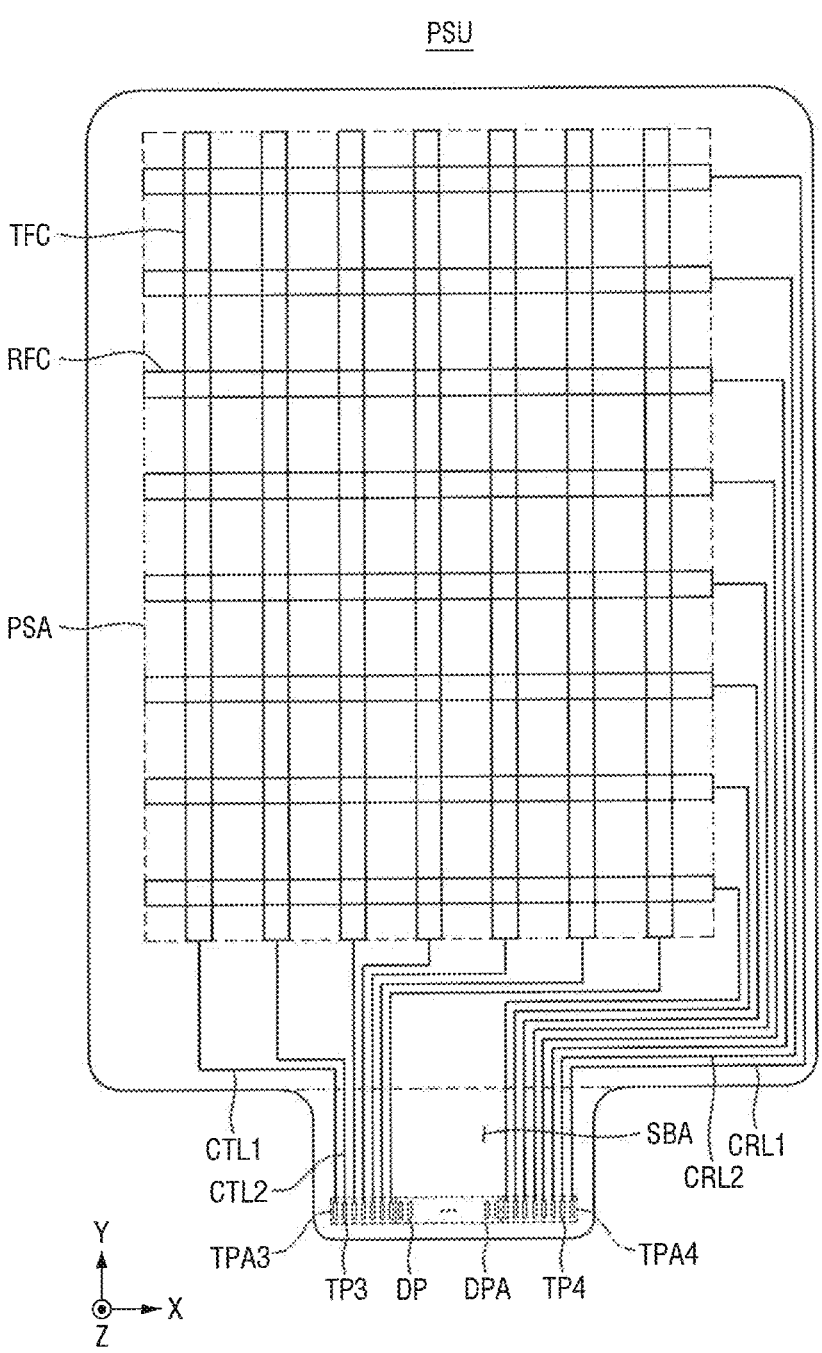
FIG. 20 is a layout diagram schematically showing a touch electrode arrangement structure of a second touch sensing unit according to still another embodiment of the present disclosure.

FIG. 20 is a layout diagram schematically showing a touch electrode arrangement structure of a second touch sensing unit according to still another embodiment of the present disclosure.

Referring to FIG. 20, in the pen touch sensing area PSA, bar type electrodes, which are different from the pen touch electrodes of a coil type, may be formed. In other words, a plurality of first bar type electrodes TFC and a plurality of second bar type electrodes RFC may be disposed in the pen touch sensing area PSA.

The first bar type electrodes TFC may be arranged in parallel with each other in the first direction (X-axis direction). Odd-numbered electrodes or electrodes included in an odd-numbered group among the first bar type electrodes TFC may respectively receive the pen touch driving signals at their one ends through the first input coil lines CTL1. In addition, even-numbered electrodes or electrodes included in an even-numbered group among the first bar type electrodes TFC may output the pen touch sensing signals to the first output coil lines CTL2.

The second bar type electrodes RFC may be arranged in parallel with each other in the second direction (Y-axis direction). Odd-numbered electrodes or electrodes included in an odd-numbered group among the second bar type electrodes RFC may respectively receive the pen touch driving signals at their one ends through the second input coil lines RTL1. In addition, even-numbered electrodes or electrodes included in an even-numbered group among the second bar type electrodes RFC may output the pen touch sensing signals to the second output coil lines RTL2.

The first input coil lines CTL1 connected to the odd-numbered first bar type electrodes TFC and the first output coil lines CTL2 connected to the even-numbered first bar type electrodes TFC may be connected one-to-one to the third touch pads TP3. In addition, the second input coil lines CRL1 connected to the odd-numbered second bar type electrodes RFC and the second output coil lines CRL2 connected to the even-numbered second bar type electrodes RFC may be connected one-to-one to the fourth touch pads TP4.

The touch sensing circuit 400 may supply the pen touch driving signals to the odd-numbered first bar type electrodes TFC or the first bar type electrodes TFC included in the odd-numbered group in the pen touch sensing area PSA based on the pen touch driving frequency. In addition, the touch sensing circuit 400 may supply the pen touch driving signals to the odd-numbered second bar type electrodes RFC or the second bar type electrodes RFC included in the odd-numbered group. In addition, the touch sensing circuit 400 receives the pen touch sensing signals from the even-numbered first bar type electrodes TFC or the first bar type electrodes TFC included in the even-numbered group and from the even-numbered second bar type electrodes RFC or the second bar type electrodes RFC included in the even-numbered group.

The touch sensing circuit 400 may detect a touch position by sensing amplitude variations of the pen touch sensing signals outputted respectively from the even-numbered first and second bar type electrodes TFC and RFC or the first and second bar type electrodes TFC and RFC included in the even-numbered group.

Figure 21:
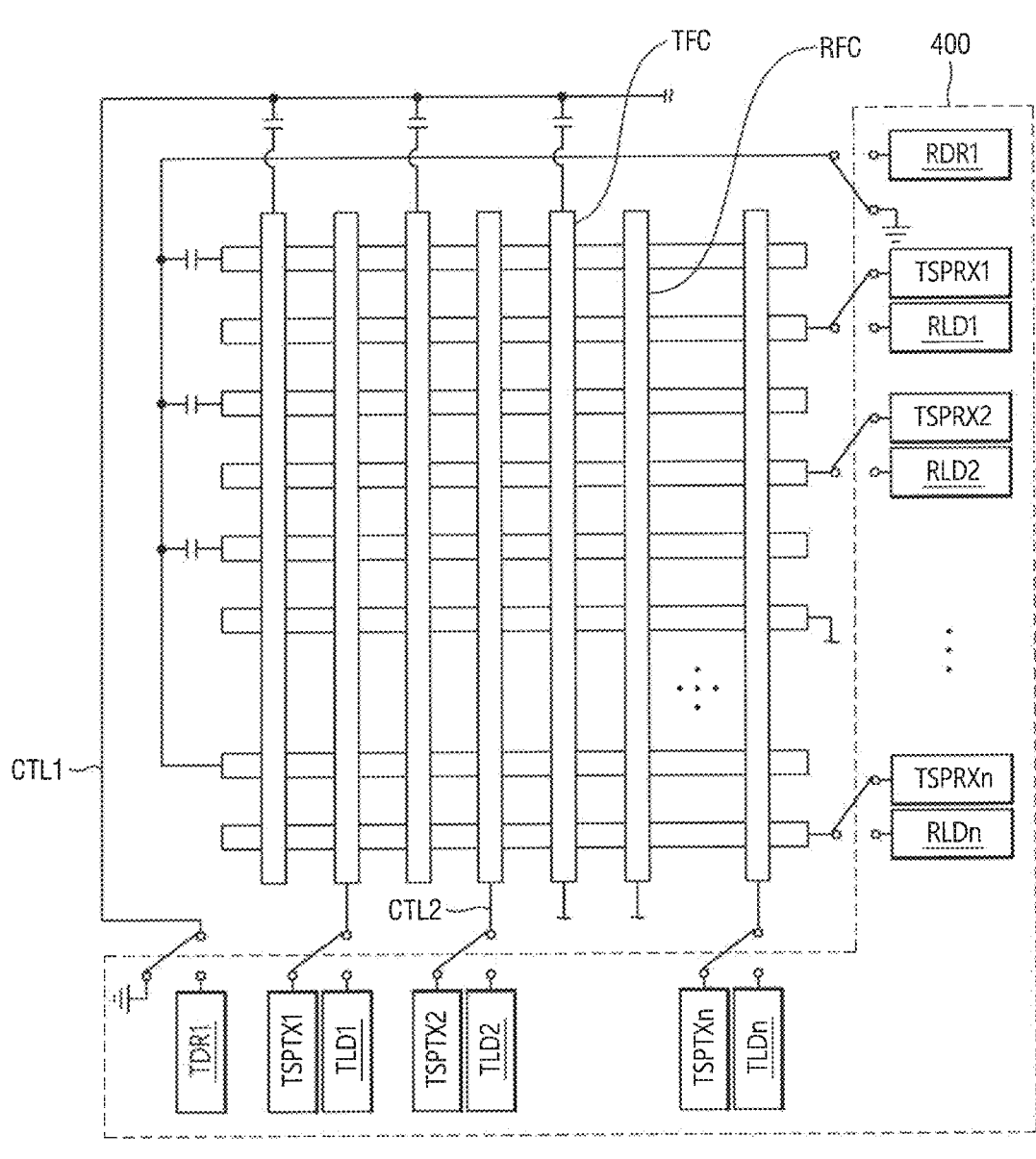
FIG. 21 is a layout diagram illustrating an electrical connection structure between the touch electrodes shown in FIG. 20 and a touch sensing circuit.

FIG. 21 is a layout diagram illustrating an electrical connection structure between the touch electrodes shown in FIG. 20 and a touch sensing circuit.

Referring to FIG. 21, at least one first driving signal supply unit TDR1 is electrically connected to the odd-numbered first bar type electrodes TFC or the first bar type electrodes TFC included in the odd-numbered group to supply the pen touch driving signals to the odd-numbered first bar type electrodes TFC or the first bar type electrodes TFC included in the odd-numbered group.

One or more coupling capacitors may be additionally formed between the first driving signal supply unit TDR1 and the odd-numbered first bar type electrodes TFC or the first bar type electrodes TFC included in the odd-numbered group, for example, between the first bar type electrodes TFC and pen touch driving signal input lines. Since the coupling capacitors are formed between the first bar type electrodes TFC and the pen touch driving signal input lines, the first bar type electrodes TFC may be used in common with touch electrodes of a first touch sensing unit FSU that senses a user's body touch.

The plurality of first signal analysis circuit units TLD1 to TLDn may be electrically connected to the even-numbered first bar type electrodes TFC or the first bar type electrodes TFC included in the even-numbered group, and analyze each of the pen touch sensing signals inputted through the even-numbered first bar type electrodes TFC or the first bar type electrodes TFC included in the even-numbered group.

At least one second driving signal supply unit RDR1 is electrically connected to the odd-numbered second bar type electrodes RFC or the second bar type electrodes RFC included in the odd-numbered group to supply the pen touch driving signals to the odd-numbered second bar type electrodes RFC or the second bar type electrodes RFC included in the odd-numbered group.

Similarly, one or more coupling capacitors may be additionally formed between the second driving signal supply unit RDR1 and the odd-numbered second bar type electrodes RFC or the second bar type electrodes RFC included in the odd-numbered group, for example, between the second bar type electrodes RFC and the pen touch driving signal input lines. Since the coupling capacitors are formed between the second bar type electrodes RFC and the pen touch driving signal input lines, the second bar type electrodes RFC may be used in common with the touch electrodes of the first touch sensing unit FSU that senses the user's body touch.

The plurality of second signal analysis circuit units RLD1 to RLDn may be electrically connected to the even-numbered second bar type electrodes RFC or the second bar type electrodes RFC included in the even-numbered group, and analyze each of the pen touch sensing signals inputted through the even-numbered second bar type electrodes RFC or the second bar type electrodes RFC included in the even-numbered group.

When the first and second bar type electrodes TFC and RFC are used in common with the touch electrodes of the first touch sensing unit FSU, all of the pen touch driving signal input lines are connected to a ground or low potential voltage source. In addition, the first bar type electrodes TFC are respectively connected to driving signal input terminals, in other words, first to $n^{th}$ touch driving signal input terminals TSPTX1 to TSPTXn of the first touch sensing unit FSU. The second bar type electrodes RFC are respectively connected to first to $n^{th}$ touch sensing signal output terminals TSPRX1 to TSPRXn of the first touch sensing unit FSU. Accordingly, each of the first bar type electrodes TFC may be used as the driving electrode TE, and each of the second bar type electrodes RFC may be used as the sensing electrode RE.

Figure 22:
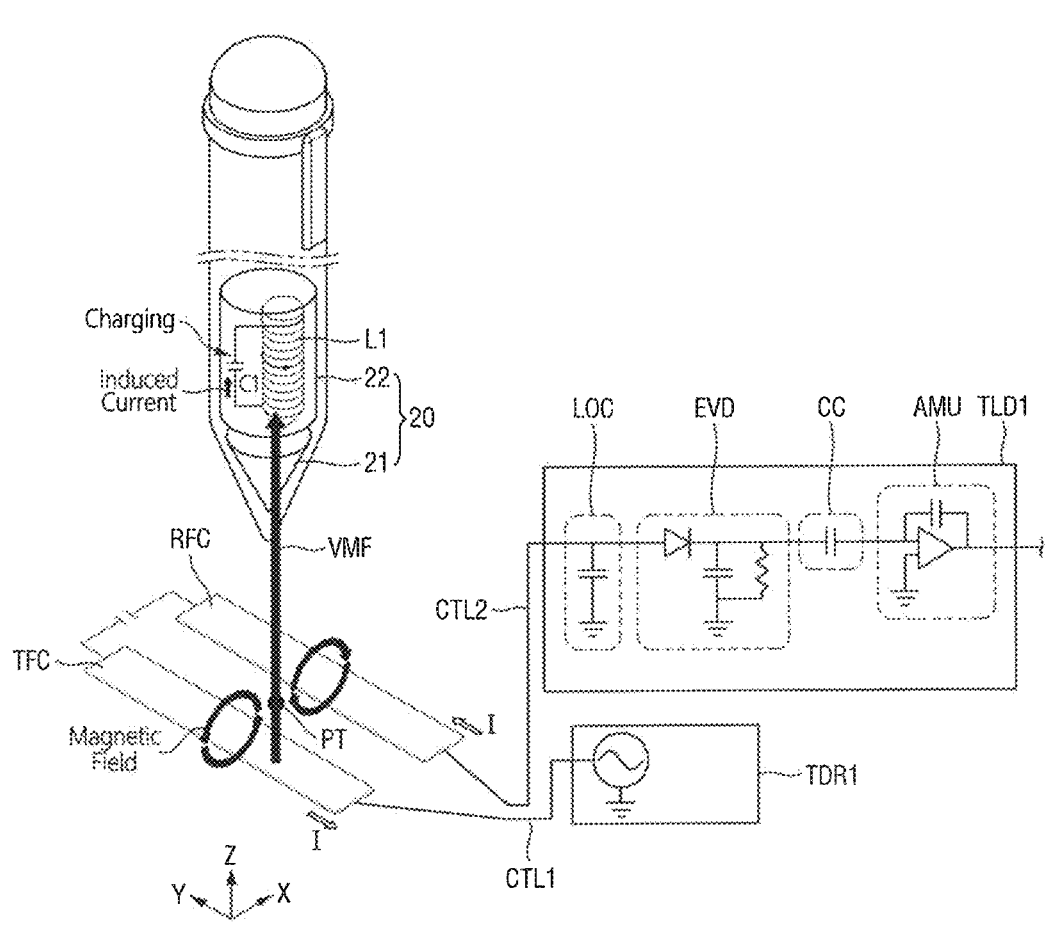
FIG. 22 is a configuration diagram for describing a touch driving operation of the touch sensing circuit and a charging/discharging operation of the electronic pen according to FIGS. 20 and 21.
Figure 23:
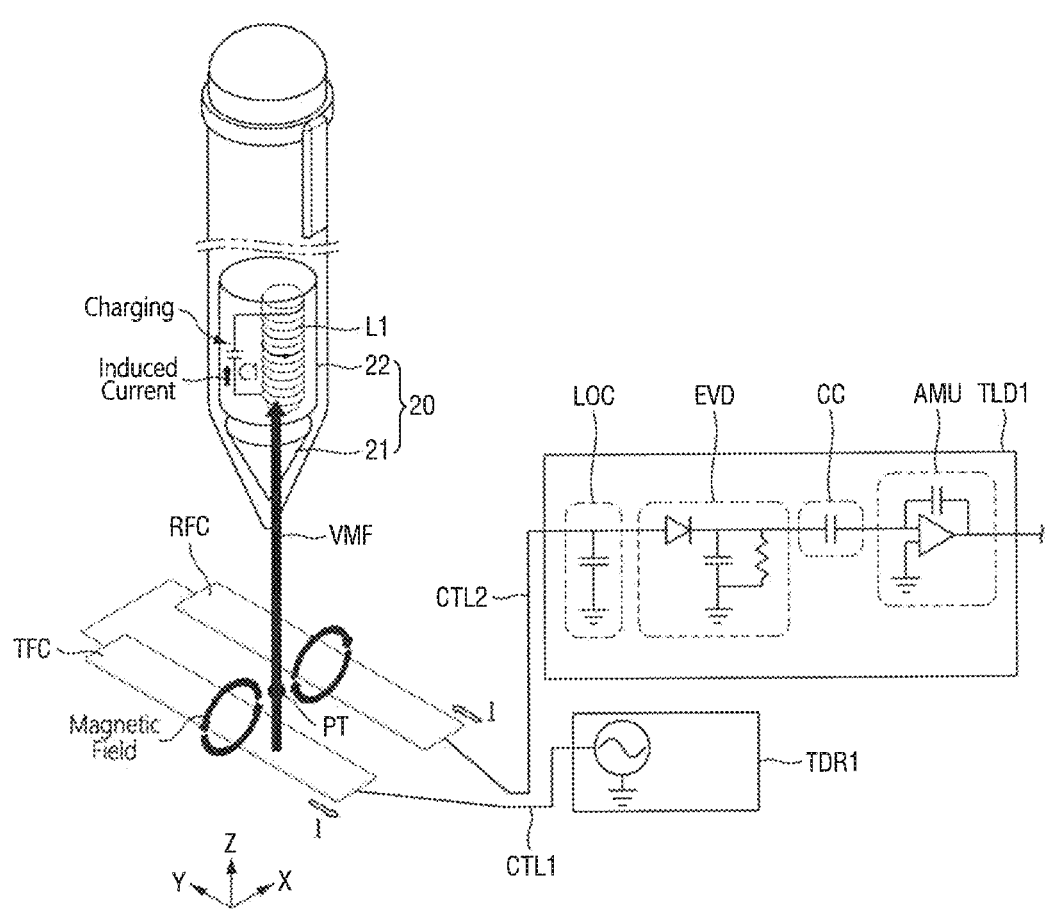
FIG. 23 is another configuration diagram for describing a touch driving operation of the touch sensing circuit and a charging/discharging operation of the electronic pen according to FIGS. 20 and 21.

FIG. 22 is a configuration diagram for describing a touch driving operation of the touch sensing circuit and a charging/discharging operation of the electronic pen according to FIGS. 20 and 21. FIG. 23 is another configuration diagram for describing a touch driving operation of the touch sensing circuit and a charging/discharging operation of the electronic pen according to FIGS. 20 and 21.

First, referring to FIG. 22, the first and second driving signal supply units TDR1 and RDR1 respectively supply the pen touch driving signals to the odd-numbered first and second bar type electrodes TFC and RFC. Each of the first and second driving signal supply units TDR1 and RDR1 may include at least one driving signal output module to generate and output the pen touch driving signal having a plurality of driving pulses using the driving signal output module.

A coupling capacitor may be formed between the first and second bar type electrodes TFC and RFC that are adjacent to each other, and thus the adjacent first and second bar type electrodes TFC and RFC may be electrically connected to each other. In other words, each of the first and second driving signal supply units TDR1 and RDR1 and the adjacent first and second bar type electrodes TFC and RFC may form an electrical loop structure via the coupling capacitor.

As shown in FIG. 23, the adjacent first and second bar type electrodes TFC and RFC may be directly electrically connected to each other at their one ends or the other ends. The adjacent first and second bar type electrodes TFC and RFC are electrically connected to each other, so that the adjacent first and second bar type electrodes TFC and RFC may form an electrical loop structure with each of the first and second driving signal supply units TDR1 and RDR1. Accordingly, a current may flow through the adjacent first and second bar type electrodes TFC and RFC in the arrangement direction thereof, and a magnetic field may be formed in the arrangement direction of the even-numbered first and second bar type electrodes TFC and RFC.

The coil L1 of the electronic pen 20 may receive a magnetic field VMF in the third direction (Z-axis direction), which has been induced from the odd-numbered first and second bar type electrodes TFC and RFC, to generate an induced current. The induced current flowing through the resonant circuit unit 22 may charge the capacitor C1. For example, an LC resonant frequency of the electronic pen 20 may be determined based on the capacitance of the capacitor C1 and the inductance of the coil L1.

In particular, the coil L1 of the electronic pen 20 may generate an induced current, and the induced current may charge the capacitor C1. Accordingly, the electromotive force of the capacitor C1 may increase during the charging period of the coil L1.

The first and second signal analysis circuit units TLD1 to TLDn and RLD1 to RLDn sense amplitude variations of the pen touch sensing signals inputted from the even-numbered first and second bar type electrodes TFC and RFC that are connected one-to-one thereto. In other words, each of the first and second signal analysis circuit units TLD1 to TLDn and RLD1 to RLDn may detect the amplitude variation of the inputted pen touch sensing signal, and may detect the touch and the touch position of the electronic pen 20 according to the amplitude decrement detection signal of the pen touch sensing signal.

Figure 24:
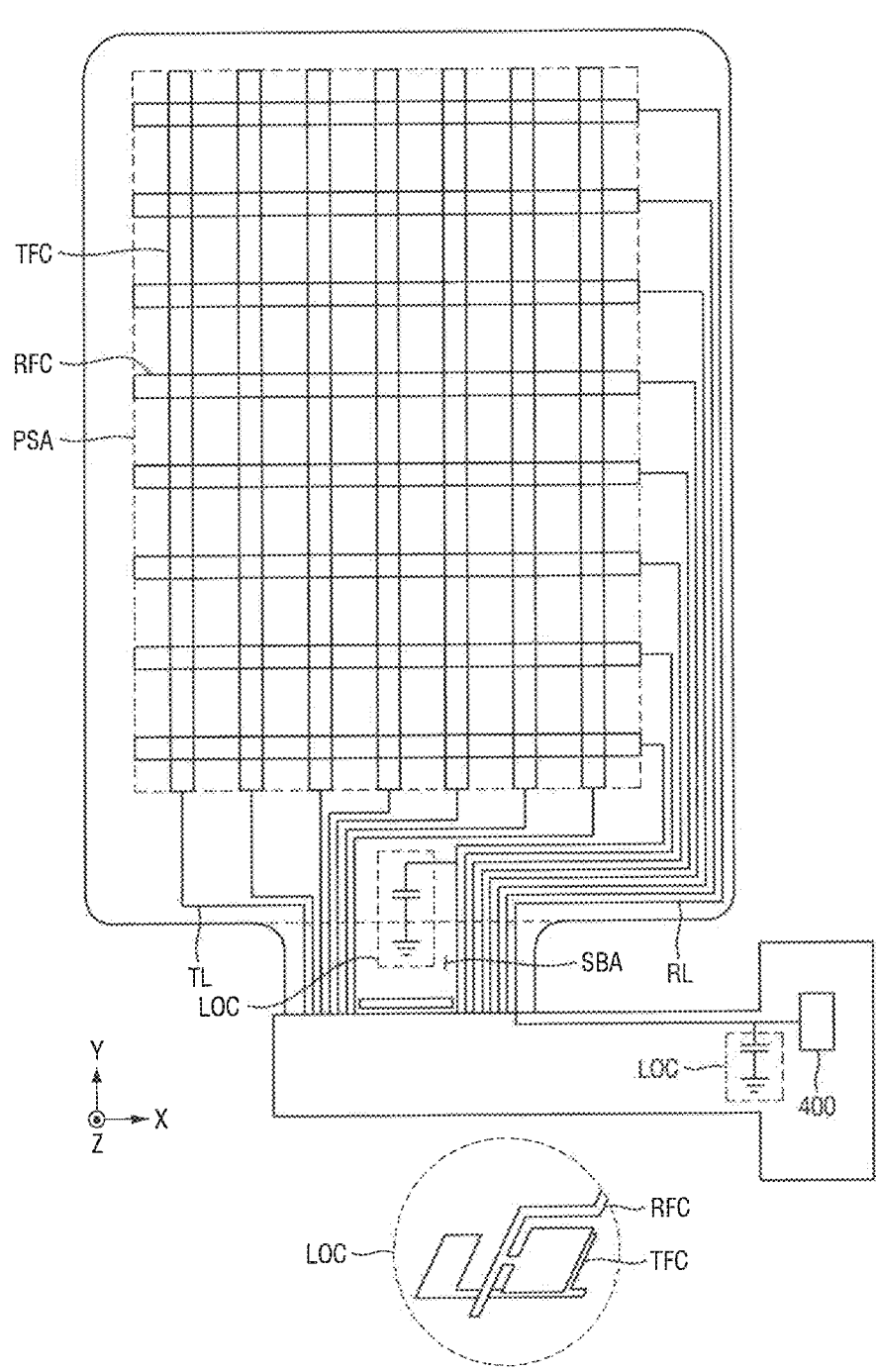
FIG. 24 is a configuration diagram illustrating an arrangement position of a load capacitor according to still another embodiment of the present disclosure.

FIG. 24 is a configuration diagram illustrating an arrangement position of a load capacitor according to still another embodiment of the present disclosure.

As described above, each of the first and second signal analysis circuit units TLD1 to TLDn and RLD1 to RLDn may include the at least one load capacitor LOC, the envelope detector EVD, the AC capacitor CC, and the operational amplifier AMU as the components for sensing the amplitude variation of the pen touch sensing signal.

Among them, the load capacitor LOC is connected in parallel with the output terminal of each pen touch electrode, for example, at least one electrode of the first and second bar type electrodes TFC and RFC to stabilize output currents of the first and second bar type electrodes TFC and RFC. To accomplish this, the load capacitor LOC may be integrally formed with the first and second bar type electrodes TFC and RFC at the out terminals of the first and second bar type electrodes TFC and RFC that are formed in the second touch sensing unit PSU.

Specifically, the load capacitor LOC may be formed in the same layer as the first and second bar type electrodes TFC and RFC with a gap therebetween. In contrast, the load capacitor LOC may be formed integrally with the first input coil lines CTL1, the first output coil lines CTL2, the second input coil lines CRL1, and the second output coil lines CRL2 at the input terminals of the touch sensing circuit 400.

Accordingly, each of the first and second signal analysis circuit units TLD1 to TLDn and RLD1 to RLDn may include only the envelope detector EVD, the AC capacitor CC, and the operational amplifier AMU as the components for sensing the amplitude variation of the pen touch sensing signal.

Figure 25:
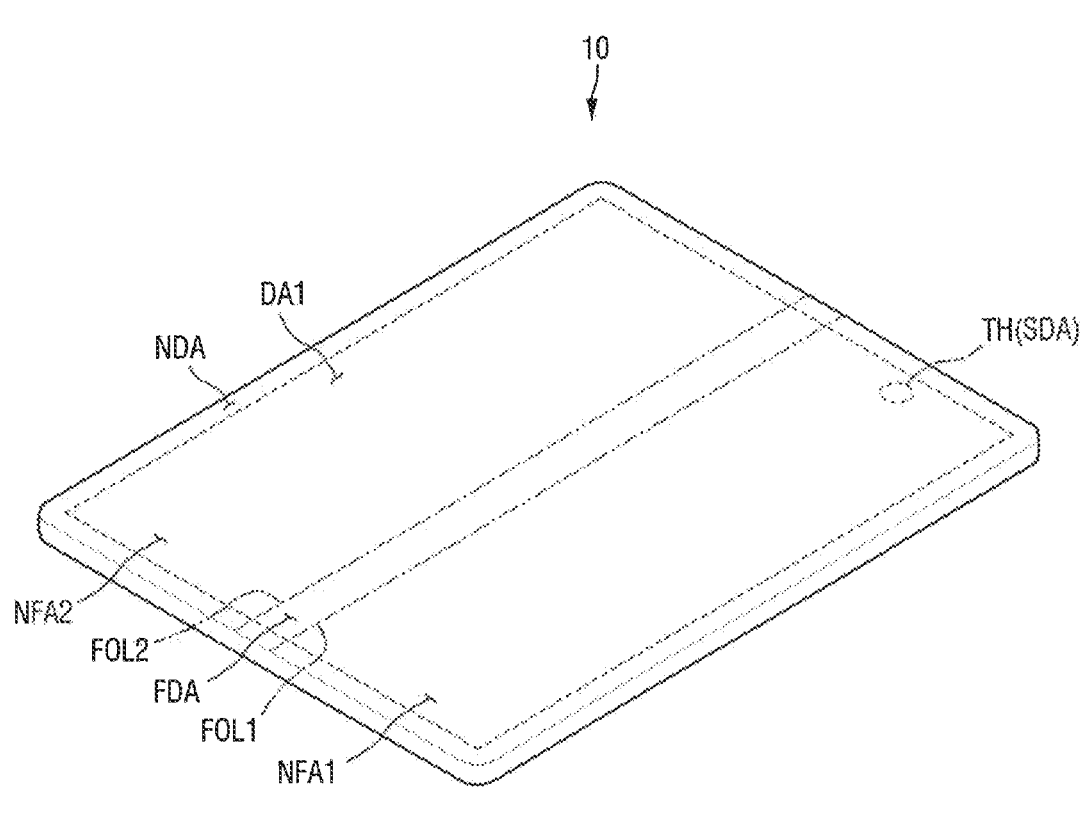
FIGS. 25 and 26 are perspective views illustrating a display device according to another embodiment of the present disclosure.
Figure 25:
Figure 26:
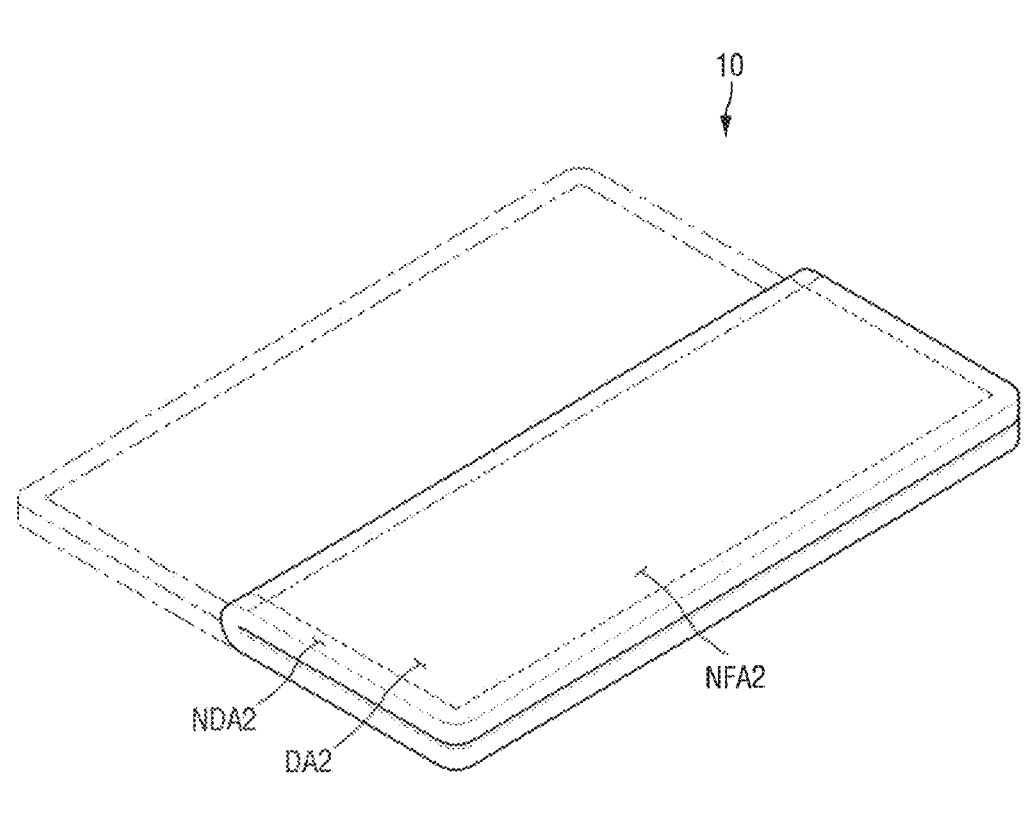

FIGS. 25 and 26 are perspective views illustrating a display device according to another embodiment of the present disclosure.

FIGS. 25 and 26 illustrate the display device 10 as a foldable display device that is folded in the first direction (X-axis direction). The display device 10 may maintain both a folded state and an unfolded state. The display device 10 may be folded in an in-folding manner in which the front surface is disposed on the inside thereof. When the display device 10 is bent or folded in the in-folding manner, the front surfaces of the display device 10 may be disposed to face each other. Alternatively, the display device 10 may be folded in an out-folding manner in which the front surface is disposed on the outside thereof. When the display device 10 is bent or folded in an out-folding manner, the rear surfaces of the display device 10 may be disposed to face each other.

A first non-folding area NFA1 may be disposed on one side, for example, the right side of a folding area FDA. A second non-folding area NFA2 may be disposed on the other side, for example, the left side of the folding area FDA. The touch sensing unit TSU according to an embodiment of the present disclosure may be disposed on each of the first non-folding area NFA1 and the second non-folding area NFA2.

A first folding line FOL1 and a second folding line FOL2 extend in the second direction (Y-axis direction), and the display device 10 may be folded in the first direction (X-axis direction). Accordingly, the length of the display device 10 in the first direction (X-axis direction) may be reduced to approximately half, so that a user can conveniently carry the display device 10.

The extension direction of the first folding line FOL1 and the extension direction of the second folding line FOL2 are not limited to the second direction (Y-axis direction). For example, the first folding line FOL1 and the second folding line FOL2 may extend in the first direction (X-axis direction), and the display device 10 may be folded in the second direction (Y-axis direction). In this case, the length of the display device 10 in the second direction (Y-axis direction) may be reduced to approximately half. Alternatively, the first folding line FOL1 and the second folding line FOL2 may extend in the diagonal direction of the display device 10 between the first direction (X-axis direction) and the second direction (Y-axis direction). In this case, the display device 10 may be folded in a triangular shape.

When the first folding line FOL1 and the second folding line FOL2 extend in the second direction (Y-axis direction), the length of the folding area FDA in the first direction (X-axis direction) may be shorter than the length of the folding area FDA in the second direction (Y-axis direction). Further, the length of the first non-folding area NFA1 in the first direction (X-axis direction) may be longer than the length of the folding area FDA in the first direction (X-axis direction). The length of the second non-folding area NFA2 in the first direction (X-axis direction) may be longer than the length of the folding area FDA in the first direction (X-axis direction).

The first display area DA1 may be disposed on the front surface of the display device 10. The first display area DA1 may overlap the folding area FDA, the first non-folding area NFA1, and the second non-folding area NFA2. Therefore, when the display device 10 is unfolded, an image may be displayed toward the front side thereof in the folding area FDA, the first non-folding area NFA1, and the second non-folding area NFA2 of the display device 10.

The second display area DA2 may be disposed on the rear surface of the display device 10. The second display area DA2 may overlap the second non-folding area NFA2. Therefore, when the display device 10 is folded, an image may be displayed toward the front side thereof in the second non-folding area NFA2 of the display device 10.

FIGS. 25 and 26 illustrate that a through hole TH having a camera SDA formed therein is disposed in the first non-folding area NFA1, but the present disclosure is not limited thereto. The through hole TH or the camera SDA may be disposed in the second non-folding area NFA2 or the folding area FDA.

Figure 27:
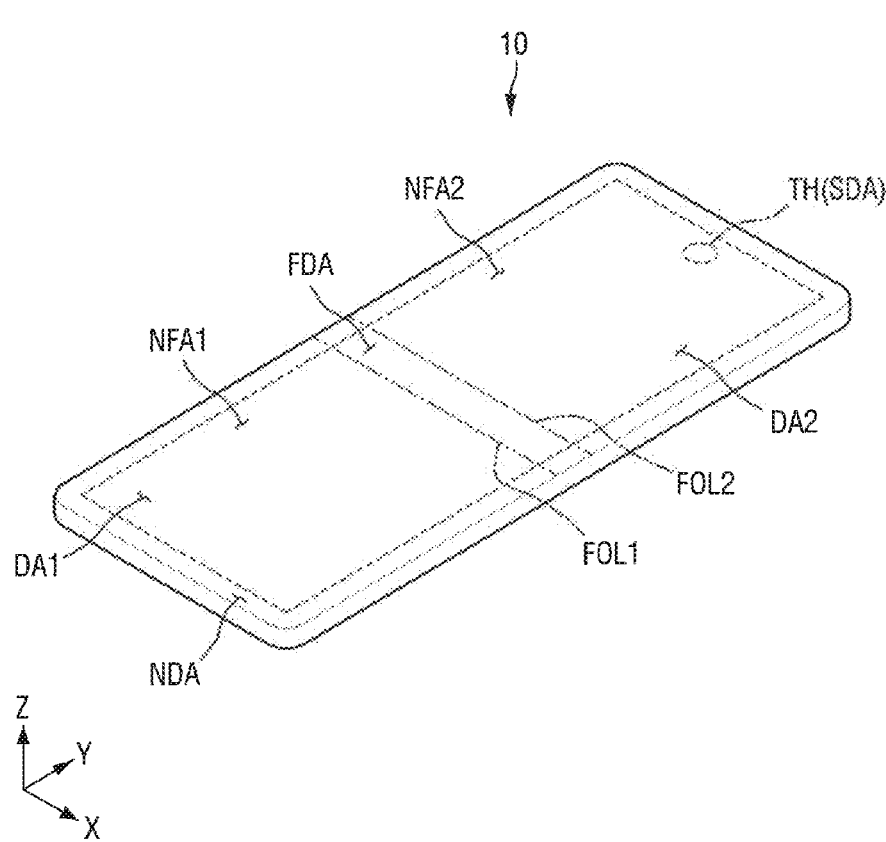
FIGS. 27 and 28 are perspective views illustrating a display device according to still another embodiment of the present disclosure.
Figure 28:
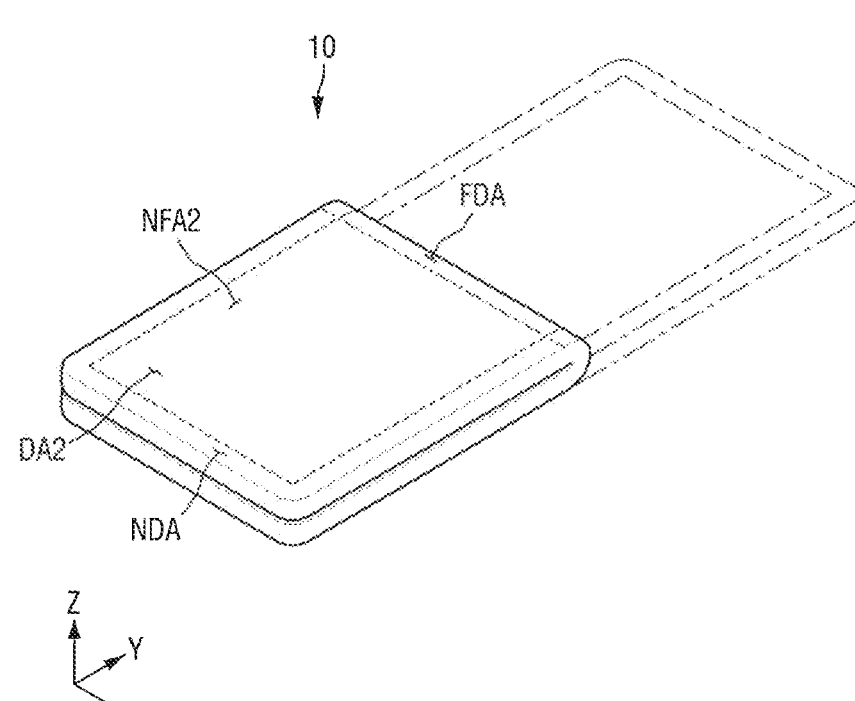

FIGS. 27 and 28 are perspective views illustrating a display device according to still another embodiment of the present disclosure.

FIGS. 27 and 28 illustrate the display device 10 as a foldable display device that is folded in the second direction (Y-axis direction). The display device 10 may maintain both a folded state and an unfolded state. The display device 10 may be folded in an in-folding manner in which the front surface is disposed on the inside thereof. When the display device 10 is bent or folded in the in-folding manner, the front surfaces of the display device 10 may be disposed to face each other. Alternatively, the display device 10 may be folded in an out-folding manner in which the front surface is disposed on the outside thereof. When the display device 10 is bent or folded in an out-folding manner, the rear surfaces of the display device 10 may be disposed to face each other.

The display device 10 may include a folding area FDA, the first non-folding area NFA1, and the second non-folding area NFA2. The folding area FDA may be an area in which the display device 10 is folded, and the first and second non-folding areas NFA1 and NFA2 may be areas in which the display device 10 is not folded. The first non-folding area NFA1 may be disposed on one side (e.g., a lower side) of the folding area FDA. The second non-folding area NFA2 may be disposed on the other side (e.g., an upper side) of the folding area FDA.

The touch sensing unit TSU according to an embodiment of the present disclosure may be disposed on each of the first non-folding area NFA1 and the second non-folding area NFA2.

On the other hand, the folding area FDA may be a curved area with a predetermined curvature at a first folding line FOL1 and a second folding line FOL2. Thus, the first folding line FOL1 may be the boundary between the folding area FDA and the first non-folding area NFA1, and the second folding line FOL2 may be the boundary between the folding area FDA and the second non-folding area NFA2.

The first folding line FOL1 and the second folding line FOL2 may extend in the first direction (X-axis direction) as shown in FIGS. 27 and 28. In this case, the display device 10 may be folded in the second direction (Y-axis direction). Accordingly, the length of the display device 10 in the second direction (Y-axis direction) may be reduced to approximately half, so that a user can conveniently carry the display device 10.

The extension direction of the first folding line FOL1 and the extension direction of the second folding line FOL2 are not limited to the first direction (X-axis direction). For example, the first folding line FOL1 and the second folding line FOL2 may extend in the second direction (Y-axis direction), and the display device 10 may be folded in the first direction (X-axis direction). In this case, the length of the display device 10 in the first direction (X-axis direction) may be reduced to approximately half. Alternatively, the first folding line FOL1 and the second folding line FOL2 may extend in the diagonal direction of the display device 10 between the first direction (X-axis direction) and the second direction (Y-axis direction). In this case, the display device 10 may be folded in a triangular shape.

When the first folding line FOL1 and the second folding line FOL2 extend in the first direction (X-axis direction) as shown in FIGS. 27 and 28, the length of the folding area FDA in the second direction (Y-axis direction) may be shorter than the length of the folding area FDA in the first direction (X-axis direction). Further, the length of the first non-folding area NFA1 in the second direction (Y-axis direction) may be longer than the length of the folding area FDA in the second direction (Y-axis direction). The length of the second non-folding area NFA2 in the second direction (Y-axis direction) may be longer than the length of the folding area FDA in the second direction (Y-axis direction).

The first display area DA1 may be disposed on the front surface of the display device 10. The first display area DA1 may overlap the folding area FDA, the first non-folding area NFA1, and the second non-folding area NFA2. Therefore, when the display device 10 is unfolded, an image may be displayed toward the front side thereof in the folding area FDA, the first non-folding area NFA1, and the second non-folding area NFA2 of the display device 10.

The second display area DA2 may be disposed on the rear surface of the display device 10. The second display area DA2 may overlap the second non-folding area NFA2. Therefore, when the display device 10 is folded, an image may be displayed toward the front side thereof in the second non-folding area NFA2 of the display device 10.

FIGS. 27 and 28 illustrate that the through hole TH in which the camera SDA or the like is disposed is disposed in the second non-folding area NFA2, but the present disclosure is not limited thereto. The through hole TH may be disposed in the first non-folding area NFA1 or the folding area FDA.

In concluding the detailed description, those skilled in the art will appreciate that many variations and modifications can be made to the aforementioned embodiments. Therefore, the embodiments of the disclosure are used in a generic and descriptive sense and not for purposes of limitation.

What is claimed is:

1. A display device comprising:
a display panel in which a plurality of pixels are arranged in an image display area;
a touch sensing unit disposed on the display panel, wherein the touch sensing unit includes first pen touch electrodes arranged in a first direction and second pen touch electrodes arranged in a second direction intersecting the first direction, and wherein the touch sensing unit is configured to sense a touch of an electronic pen;
a display driving circuit configured to drive the pixels; and
a touch sensing circuit configured to apply pen touch driving signals to drive individual ones of the first pen touch electrodes and individual ones of the second pen touch electrodes to electromagnetically charge the electronic pen, and to recognize a touch position of the electronic pen by detecting variations in individual ones of each touch sensing signal of each of the first pen touch electrodes and detecting variations in individual ones of each touch sensing signal of each of the second pen touch electrodes, wherein
the first pen touch electrodes are arranged in parallel the first direction in a pen touch sensing area; and
the second pen touch electrodes are arranged in parallel in the second direction in the pen touch sensing area.

2. The display device of claim 1, wherein the first and second pen touch electrodes are formed in a coil having a shape of a rectangle, an ellipse, a circle, or a polygon, and a first end and a second end of each of the first and second pen touch electrodes are electrically connected to the touch sensing circuit.

3. The display device of claim 1, wherein the touch sensing circuit is configured to simultaneously supply pen touch driving signals to the first pen touch electrodes and the second pen touch electrodes in units of at least one frame.

4. The display device of claim 1, wherein the touch sensing circuit comprises:

at least one driving signal supply unit configured to supply a pulse type pen touch driving signal to the first and second pen touch electrodes; and at least one signal analysis circuit unit configured to detect an amplitude variation of pen touch sensing signals output through the first and second pen touch electrodes.

5. The display device of claim 1, wherein the touch sensing circuit comprises:

a plurality of first driving signal supply units connected one-to-one to first ends of the first pen touch electrodes to supply pen touch driving signals to the first pen touch electrodes;

a plurality of first signal analysis circuit units connected one-to-one to second ends of the first pen touch electrodes to respectively analyze pen touch sensing signals inputted through the first pen touch electrodes;

a plurality of second driving signal supply units connected one-to-one to first ends of the second pen touch electrodes to supply the pen touch driving signals to the second pen touch electrodes; and a plurality of second signal analysis circuit units connected one-to-one to second ends of the second pen touch electrodes to respectively analyze the pen touch sensing signals inputted through the second pen touch electrodes.

6. The display device of claim 5, wherein each of the first and second signal analysis circuit units comprises:

at least one load capacitor connected in parallel with the first and second pen touch electrodes to stabilize an output current of each of the first and second pen touch electrodes;

an envelope detector connected in series with an output terminal of each of the first and second pen touch electrodes to detect an envelope variation of the pen touch sensing signal outputted through the load capacitor, and output an amplitude decrement detection signal according to the envelope variation;

an AC capacitor connected in series with the envelope detector to prevent a reversal of the amplitude decrement detection signal according to the envelope variation; and an operational amplifier connected in series with the AC capacitor to amplify and output the amplitude decrement detection signal with respect to the pen touch sensing signal.

7. The display device of claim 1, wherein the touch sensing circuit comprises:

a plurality of first driving signal supply units connected one-to-one to first ends of the first pen touch electrodes to sequentially supply pen touch driving signals to the first pen touch electrodes;

one first signal analysis circuit unit electrically connected to all of the first pen touch electrodes to analyze the pen touch sensing signals inputted through all of the first pen touch electrodes;

a plurality of second driving signal supply units connected one-to-one to first ends of the second pen touch electrodes to sequentially supply the pen touch driving signals to the second pen touch electrodes; and one second signal analysis circuit unit electrically connected to all of the second pen touch electrodes to analyze the pen touch sensing signals inputted through all of the second pen touch electrodes.

8. The display device of claim 1, wherein the touch sensing circuit comprises:

one first driving signal supply unit electrically connected to all of the first pen touch electrodes to simultaneously supply pen touch driving signals to the first pen touch electrodes;

a plurality of first signal analysis circuit units connected one-to-one to the first pen touch electrodes to analyze pen touch sensing signals respectively inputted from the first pen touch electrodes;

one second driving signal supply unit electrically connected to all of the second pen touch electrodes to simultaneously supply the pen touch driving signals to the second pen touch electrodes; and a plurality of second signal analysis circuit units connected one-to-one to the second pen touch electrodes to analyze pen touch signals respectively inputted from the second pen touch electrodes.

9. The display device of claim 1, wherein the touch sensing circuit comprises:

one first driving signal supply unit connected to all of the first pen touch electrodes to supply pen touch driving signals to all of the first pen touch electrodes during a charging period of the electronic pen in a touch start detection period of the electronic pen and a touch position detection period of the electronic pen;

a plurality of first signal analysis circuit units connected one-to-one to the first pen touch electrodes to analyze pen touch sensing signals respectively inputted from the first pen touch electrodes during the touch start detection period of the electronic pen;

one second driving signal supply unit connected to all of the second pen touch electrodes to supply pen touch driving signals to all of the second pen touch electrodes during the charging period of the electronic pen in the touch start detection period of the electronic pen and the touch position detection period of the electronic pen;

a plurality of second signal analysis circuit units connected one-to-one to the second pen touch electrodes to analyze pen touch sensing signals respectively inputted from the second pen touch electrodes during the touch start detection period of the electronic pen; and a plurality of third signal analysis circuit units configured to detect the touch position of the electronic pen by sensing a variation of the pen touch sensing signal of each of the first and second pen touch electrodes according to a discharge amount of the electronic pen during a discharging period of the electronic pen in the touch position detection period of the electronic pen.

10. The display device of claim 9, wherein the plurality of third signal analysis circuit units are configured to compare, with a reference signal of a preset threshold, the pen touch sensing signals respectively inputted through the first and second pen touch electrodes during each discharging period of the electronic pen in the touch position detection period of the electronic pen, and to determine that a touch has been made by the electronic pen if a voltage level of the pen touch sensing signals is greater than the preset threshold, and determine the touch position according to a position of at least one of the first and second pen touch electrodes at which it is determined that the touch has been made.

11. The display device of claim 9, wherein each of the first and second signal analysis circuit units is configured to stabilize pen touch sensing signals inputted through first and second pen touch electrodes during the touch start detection period of the electronic pen using at least one load capacitor, to detect an envelope variation of the pen touch sensing signal outputted through the load capacitor using an envelope detector and generate an amplitude decrement detection signal according to the envelope variation, and to amplify the amplitude decrement detection signal with respect to the pen touch sensing signal and detect a touch position with respect to each of the first and second pen touch electrodes according to an amplitude variation of the amplitude decrement detection signal.

12. The display device of claim 9, wherein the touch sensing circuit comprises:

a plurality of first switches disposed between each of the first and second pen touch electrodes and the plurality of third signal analysis circuit units to electrically connect the first and second pen touch electrodes to the corresponding third signal analysis circuit units during each discharging period of the electronic pen during the touch position detection period of the electronic pen; and a plurality of second switches disposed between the first and second pen touch electrodes and at least one first or second signal analysis circuit unit to electrically connect the first and second pen touch electrodes to the first or second driving signal supply units during each charging period of the electronic pen in the touch start detection period and the touch position detection period of the electronic pen.

13. The display device of claim 12, wherein the touch sensing circuit further comprises:

a plurality of third switches disposed between the first and second pen touch electrodes and at least one of the first and second signal analysis circuit units to electrically connect the first and second pen touch electrodes to at least one of the first and second signal analysis circuit units during each touch start detection period of the electronic pen; and a plurality of fourth switches disposed between the first and second pen touch electrodes and a ground or low potential voltage source to electrically connect the first and second pen touch electrodes to the ground or low potential voltage source during each touch position detection period of the electronic pen.

14. The display device of claim 13, wherein the touch sensing circuit turns on the second and third switches during the touch start detection period so that the pen touch driving signals from the first and second driving signal supply units are supplied to first ends of the first and second pen touch electrodes, and the pen touch sensing signals outputted to second ends of the first and second pen touch electrodes are respectively outputted to the first and second signal analysis circuit units.

15. The display device of claim 13, wherein the touch sensing circuit alternately and repeatedly turns on or turns off the first and second switches during predetermined ones of the charging/discharging periods so that charging and discharging operations of the electronic pen are alternately repeated during the touch position detection period.

16. The display device of claim 1, wherein the first and second pen touch electrodes are bar type electrodes arranged in parallel with each other in the first or second direction, among the first pen touch electrodes, at least one first pen touch electrode and at least one first pen touch electrode disposed adjacent to each other are electrically connected to each other, and among the second pen touch electrodes, at least one second pen touch electrode and at least one second pen touch electrode disposed adjacent to each other are electrically connected to each other.

17. The display device of claim 16, wherein odd-numbered electrodes or electrodes included in an odd-numbered group among the first pen touch electrodes receive pen touch driving signals at their first ends, and even-numbered electrodes or electrodes included in an even-numbered group among the first pen touch electrodes output pen touch sensing signals, and wherein odd-numbered electrodes or electrodes included in an odd-numbered group among the second pen touch electrodes receive the pen touch driving signals at their first ends, and even-numbered electrodes or electrodes included in an even-numbered group among the second pen touch electrodes output the pen touch sensing signals.

18. A touch sensing system, comprising:

a display device comprising a display panel in which a plurality of pixels are arranged in an image display area, and a display driving circuit configured to drive the pixels;

a first touch sensing unit disposed on a surface of the display panel to sense a touch by a user's body part;

a second touch sensing unit disposed on a surface of the first touch sensing unit to sense a touch of an electronic pen; and a touch sensing circuit configured to generate touch coordinate data by detecting a touch position of the electronic pen, wherein the touch sensing circuit is configured to apply touch driving signals to drive individual ones of pen touch electrodes to electromagnetically charge the electronic pen, and to recognize a touch position of the electronic pen by detecting variations in individual ones of each touch sensing signal of each of the pen touch electrodes;

wherein the pen touch electrodes comprise:

first pen touch electrodes arranged in parallel with each other in a first direction; and second pen touch electrodes arranged in parallel with each other in a second direction crossing the first direction.

19. An electronic device, comprising:

a display device for displaying an image and sensing a user's touch, wherein the display device comprises:

a display panel in which a plurality of pixels are arranged in an image display area, and a display driving circuit configured to drive the pixels;

a first touch sensing unit disposed on a surface of the display panel to sense a touch by a user's body part;

a second touch sensing unit disposed on a surface of the first touch sensing unit to sense a touch of an electronic pen; and a touch sensing circuit configured to generate touch coordinate data by detecting a touch position of the electronic pen, wherein the touch sensing circuit is configured to apply touch driving signals to drive individual ones of pen touch electrodes to electromagnetically charge the electronic pen, and to recognize a touch position of the electronic pen by detecting variations in individual ones of each touch sensing signal of each of the pen touch electrodes;

wherein the touch sensing unit comprises:

first pen touch electrodes arranged in parallel with each other in a first direction in a pen touch sensing area; and second pen touch electrodes arranged in parallel with each other in a second direction crossing the first direction in the pen touch sensing area.

20. The electronic device of claim 19, wherein the electronic pen supports electromagnetic resonance using at least one pair of electrodes and a coil connected to the at least one pair of electrodes, and is charged in response to a magnetic field or an electromagnetic signal of the second touch sensing unit, and outputs a radio frequency signal when it is discharged.

* * * * *